(12) United States Patent
Zimberoff et al.

(10) Patent No.: US 9,646,281 B2
(45) Date of Patent: May 9, 2017

(54) SYSTEMS AND METHODS FOR PROVIDING EXTENDED SHIPPING OPTIONS

(71) Applicant: Z-Firm, LLC, Seattle, WA (US)

(72) Inventors: Rafael Zimberoff, Seattle, WA (US); Alexander Uslontsev, Seattle, WA (US); Stanislav Tugushev, Seattle, WA (US); Aliaksandr Hramadski, Factoria, WA (US); Avi Levin, Chicago, IL (US); Patricia Anderson, Seattle, WA (US)

(73) Assignee: Z-Firm, LLC, Seattle, WA (US)

( * ) Notice: Subject to any disclaimer, the term of this patent is extended or adjusted under 35 U.S.C. 154(b) by 569 days.

(21) Appl. No.: 13/958,364

(22) Filed: Aug. 2, 2013

(65) Prior Publication Data

US 2013/0317999 A1   Nov. 28, 2013

Related U.S. Application Data

(63) Continuation of application No. 13/478,004, filed on May 22, 2012, now Pat. No. 8,521,656, which is a
(Continued)

(51) Int. Cl.
*G06Q 30/00* (2012.01)
*G06Q 10/08* (2012.01)
(Continued)

(52) U.S. Cl.
CPC .......... *G06Q 10/083* (2013.01); *G06Q 30/06* (2013.01); *G06Q 50/28* (2013.01); *G06Q 50/30* (2013.01)

(58) Field of Classification Search
None
See application file for complete search history.

(56) References Cited

U.S. PATENT DOCUMENTS 5,038,283 A    8/1991   Caveney
5,153,842 A   10/1992   Dlugos, Sr. et al.
(Continued)

FOREIGN PATENT DOCUMENTS

AU    2007254694 B2    1/2008
GB       2460683 A    12/2009
(Continued)

OTHER PUBLICATIONS

PR Newswire, "Advanced Data Management and Personalization Features Highlight Firstlogic's New Version of Postalsoft(R) Business Edition(TM); Powerful List Processing Capabilities Come Standard With Easy-to-Use Mailing Solution," PR Newswire Association LLC, Feb. 26, 2004.*
(Continued)

*Primary Examiner* — Nathan Erb
(74) *Attorney, Agent, or Firm* — Benedict R. Dugan; Ellen M. Bierman; Lowe Graham Jones PLLC

(57) ABSTRACT

Techniques for providing extended shipping options are described. In some embodiments, a user may specify extended shipping options that are not otherwise provided by or accessible via an existing shipment information specification user interface. In one embodiment, the user accesses a module configured to facilitate specification of extended shipping options and in response, provide an indicator of the specified extended shipping option, such as a tag or uniform resource identifier. The indicator of the extended shipping option is then incorporated into a user interface element, such as an address field, of the shipment information specification user interface. Once the user finalizes the order, the indicator of the extended shipping option is transmitted along with other shipment information items to a merchant and/or carrier system, where services specified by the extended shipping option are initiated.

25 Claims, 19 Drawing Sheets

Related U.S. Application Data continuation-in-part of application No. 13/277,958, filed on Oct. 20, 2011, now Pat. No. 8,818,912, which is a continuation-in-part of application No. 12/169,509, filed on Jul. 8, 2008, which is a continuation-in-part of application No. 11/952,561, filed on Dec. 7, 2007, now Pat. No. 7,409,353, said application No. 13/277,958 is a continuation-in-part of application No. 12/347,660, filed on Dec. 31, 2008, now Pat. No. 8,126,821.

(60) Provisional application No. 61/549,682, filed on Oct. 20, 2011, provisional application No. 61/019,208, filed on Jan. 4, 2008.

(51) Int. Cl.
*G06Q 30/06* (2012.01)
*G06Q 50/28* (2012.01)
*G06Q 50/30* (2012.01)

(56) References Cited

U.S. PATENT DOCUMENTS

| | | |
|---|---|---|
| 5,684,951 A | 11/1997 | Goldman et al. |
| 5,804,803 A | 9/1998 | Cragun et al. |
| 5,956,483 A | 9/1999 | Grate et al. |
| 5,971,277 A | 10/1999 | Cragun et al. |
| 5,992,752 A | 11/1999 | Wilz, Sr. et al. |
| 6,016,516 A | 1/2000 | Horikiri |
| 6,220,509 B1 | 4/2001 | Byford |
| 6,292,709 B1 * | 9/2001 | Uhl .................. B07C 3/00 209/584 |
| 6,360,254 B1 | 3/2002 | Linden et al. |
| 6,394,354 B1 | 5/2002 | Wilz, Sr. et al. |
| 6,539,360 B1 | 3/2003 | Kadaba |
| 6,542,927 B2 | 4/2003 | Rhoads |
| 6,778,544 B1 | 8/2004 | Holiday |
| 6,827,273 B2 | 12/2004 | Wilz, Sr. et al. |
| 6,850,986 B1 | 2/2005 | Peacock |
| 6,961,750 B1 | 11/2005 | Burd et al. |
| 6,964,374 B1 | 11/2005 | Djuknic et al. |
| 7,076,449 B2 | 7/2006 | Tsunenari et al. |
| 7,117,227 B2 | 10/2006 | Call |
| 7,184,973 B2 | 2/2007 | Monteleone et al. |
| 7,191,158 B2 | 3/2007 | Ogg et al. |
| 7,225,400 B2 | 5/2007 | Beezer et al. |
| 7,266,513 B2 | 9/2007 | Chalmers et al. |
| 7,267,273 B2 | 9/2007 | Silverbrook et al. |
| 7,409,353 B1 | 8/2008 | Uslontsev et al. |
| 7,415,524 B2 | 8/2008 | Burd et al. |
| 7,606,857 B2 | 10/2009 | Friedman et al. |
| 7,620,583 B2 | 11/2009 | Sundel |
| 7,624,025 B2 | 11/2009 | Uslontsev et al. |
| 7,641,104 B1 | 1/2010 | Leon et al. |
| 7,647,249 B2 | 1/2010 | Shroff et al. |
| 7,660,721 B2 | 2/2010 | Williams et al. |
| 7,664,651 B1 | 2/2010 | Bennett et al. |
| 7,918,402 B2 | 4/2011 | Conlon et al. |
| 7,991,871 B2 | 8/2011 | Son et al. |
| 8,027,882 B2 | 9/2011 | Shroff et al. |
| 8,126,821 B2 | 2/2012 | Uslontsev et al. |
| 8,185,479 B2 | 5/2012 | Zimberoff et al. |
| 8,805,747 B2 | 8/2014 | Zimberoff et al. |
| 8,812,409 B2 | 8/2014 | Zimberoff et al. |
| 8,818,912 B2 | 8/2014 | Uslontsev et al. |
| 2001/0005848 A1 | 6/2001 | Haverstock et al. |
| 2002/0010689 A1 | 1/2002 | Tibbs et al. |
| 2002/0013744 A1 * | 1/2002 | Tsunenari .......... G06Q 10/087 705/28 |
| 2002/0019759 A1 | 2/2002 | Arunapuram et al. |
| 2002/0032573 A1 * | 3/2002 | Williams ............ G06Q 10/08 705/335 |
| 2002/0032612 A1 | 3/2002 | Williams et al. |
| 2002/0038255 A1 | 3/2002 | Tarvydas et al. |
| 2002/0046130 A1 | 4/2002 | Monteleone et al. |
| 2002/0087548 A1 | 7/2002 | Tasalloti |
| 2002/0107772 A1 | 8/2002 | Jain et al. |
| 2002/0133434 A1 | 9/2002 | Nevel |
| 2002/0135802 A1 | 9/2002 | Perez |
| 2002/0158137 A1 | 10/2002 | Grey et al. |
| 2002/0165931 A1 | 11/2002 | Greer et al. |
| 2002/0193225 A1 | 12/2002 | Raming |
| 2003/0004830 A1 | 1/2003 | Frederick |
| 2003/0026620 A1 | 2/2003 | Gallivan |
| 2003/0217018 A1 | 11/2003 | Groff et al. |
| 2004/0006693 A1 | 1/2004 | Vasnani et al. |
| 2004/0177114 A1 | 9/2004 | Friedman et al. |
| 2004/0203636 A1 | 10/2004 | Chan et al. |
| 2004/0215480 A1 | 10/2004 | Kadaba |
| 2004/0220845 A1 | 11/2004 | Malapitan |
| 2004/0249764 A1 | 12/2004 | Delitz et al. |
| 2005/0021856 A1 * | 1/2005 | Basile .............. G07B 17/00435 709/245 |
| 2005/0038758 A1 | 2/2005 | Hilbush et al. |
| 2005/0060165 A1 | 3/2005 | Knight et al. |
| 2005/0071244 A1 | 3/2005 | Phillips et al. |
| 2005/0114221 A1 | 5/2005 | Walters et al. |
| 2005/0114222 A1 * | 5/2005 | Mundy ................ G06Q 10/08 705/26.1 |
| 2005/0130638 A1 | 6/2005 | Schrader |
| 2005/0133585 A1 | 6/2005 | Nakamura |
| 2005/0137937 A1 | 6/2005 | Njo et al. |
| 2005/0138469 A1 | 6/2005 | Ryan, Jr. et al. |
| 2005/0154923 A1 | 7/2005 | Lok et al. |
| 2005/0171791 A1 | 8/2005 | Chimenti et al. |
| 2005/0197892 A1 * | 9/2005 | Bilibin ................ G06Q 10/025 705/13 |
| 2006/0004910 A1 | 1/2006 | Burd et al. |
| 2006/0020366 A1 | 1/2006 | Bloom |
| 2006/0149577 A1 | 7/2006 | Stashluk |
| 2006/0168644 A1 | 7/2006 | Richter et al. |
| 2006/0184640 A1 | 8/2006 | Hatch |
| 2006/0195364 A1 * | 8/2006 | Shroff .................. G06Q 10/083 705/26.3 |
| 2006/0282271 A1 | 12/2006 | Ananda et al. |
| 2006/0294196 A1 | 12/2006 | Feirouz et al. |
| 2007/0055639 A1 | 3/2007 | Garvey et al. |
| 2007/0100967 A1 | 5/2007 | Smith et al. |
| 2007/0124414 A1 | 5/2007 | Bedingfield, Sr. et al. |
| 2007/0162954 A1 | 7/2007 | Pela |
| 2007/0162967 A1 | 7/2007 | de Jong et al. |
| 2007/0174213 A1 * | 7/2007 | Whitehouse .......... G06Q 30/02 705/401 |
| 2007/0192191 A1 | 8/2007 | Neal et al. |
| 2007/0299791 A1 * | 12/2007 | Mack .................. G06Q 10/08 705/402 |
| 2008/0004967 A1 * | 1/2008 | Gillen .................. G06Q 10/08 705/24 |
| 2008/0017722 A1 | 1/2008 | Snyder et al. |
| 2008/0114782 A1 | 5/2008 | Sadovsky et al. |
| 2008/0162304 A1 * | 7/2008 | Ourega .................. G06Q 10/08 705/26.4 |
| 2008/0183326 A1 | 7/2008 | Danelski |
| 2009/0146410 A1 | 6/2009 | Uslontsev et al. |
| 2009/0177739 A1 | 7/2009 | Uslontsev et al. |
| 2009/0234694 A1 | 9/2009 | Uslontsev et al. |
| 2009/0271250 A1 * | 10/2009 | Sriver ................ G06Q 30/0241 705/14.4 |
| 2010/0185522 A1 | 7/2010 | Ouchi |
| 2010/0268659 A1 | 10/2010 | Zimberoff et al. |
| 2011/0082747 A1 | 4/2011 | Khan et al. |
| 2012/0005105 A1 | 1/2012 | Beier et al. |
| 2012/0084222 A1 | 4/2012 | Zimberoff et al. |
| 2012/0089529 A1 | 4/2012 | Uslontsev et al. |
| 2012/0233085 A1 | 9/2012 | Zimberoff et al. |
| 2013/0056533 A1 | 3/2013 | Zimberoff et al. |
| 2013/0061337 A1 | 3/2013 | Zimberoff et al. |

(56) References Cited

U.S. PATENT DOCUMENTS

2013/0317999 A1 11/2013 Zimberoff et al.
2013/0318001 A1 11/2013 Zimberoff et al.

FOREIGN PATENT DOCUMENTS

JP 11328076 A 11/1999
JP 2007304652 A 11/2007

OTHER PUBLICATIONS

Wikipedia, "URL Redirection," www.wikipedia.org, version of Wikipedia article dated Nov. 28, 2006.
Business Wire, "UPS and Yahoo! Offer Integrated Shipping Tools," New York, May 3, 2004,1.
Microsoft Press; Microsoft Computer Dictionary Third Edition, 1997; pp. 178 and 426-427; 5 pages.
Merriam-Webster, Incorporated, Merriam-Webster's Collegiate Dictionary Eleventh Edition, 2007; pp. 416 and 1125; 4 pages.
www.merriam-webster.com/dictionary/enter; Online definition of "enter"; Printed Feb. 13, 2012; 4 pages.
www.merriam-webster.com/dictionary/select; Online definition of "select" printed Feb. 13, 2012; 3 pages.
Korpela, "Newsgroup Link Tag, How To?", Google Groups, USENET post, alt.html, Jul. 10, 1998.
Clark, "Building a Better Supply," Chain Store Age 78(2): 65-66, 2002.
Hoffman et al., "The Mailto URL Scheme", RFC2368, The Internet Society, 1998, URL=http://www.ietf.org/rfc2368, download date Mar. 24, 2008.
Hoffman, "The Telnet URI Scheme", RFC 4248, The Internet Society, 2005, URL=http://www.ietf.org/rfc/rfc4248, download date Mar. 24, 2008.
Masinter, "Guidelines for new URL Schemes", RFC 2718, The Internet Society, 1999, URL=http://www.ietf.org/rfc/rfc2718, download date Mar. 24, 2008.
Obasanjo, "The Feed URI Scheme (Pre-Draft)", Network Working Group, Dec. 2003, URL=http://www.25hoursaday.com/draft-obasanjo-feed-URI-scheme-02.html, download date Mar. 24, 2008.
Registry of URI Schemes, Internet Assigned Numbers Authority, 2006, URL=http://www.iana.org/assignments/uri-schemes.html, download date Oct. 8, 2007.
"FedEx Shipping Labels:—ShipRush for FedEx Shippers", URL=http://zfirm.com/products/shiprush_fedex.shtml, download date Dec. 6, 2007.
ShipRush Product Documentation Excerpts, URL—http://www.zfirm.com/Product_Documentation/ShipRush/_v5-0_FedEx/, download date, Dec. 4, 2007.
"ShipRush Product Screen Display", Screen shot from running product.
Vingralek, et al., "A Transparent Replication of HTTP Service", 15th International Conference on Data Engineering Proceedings, Mar. 23-26, 1999, p. 97.
Gammon, Ralph et al. "Toward the Digital Mailroom," Transform Magazine, Jun. 2004, pp. 28-35.
"RedRoller, Inc. Launches the 'Best Way to Ship': The Nation's First and Only Free Web-Based, On-Demand Shipping Solution Can Save 25 to 50 Percent on Annual Shipping Costs," PR Newswire, Jun. 21, 2006, 3 pages.
Forger, "Bar codes, RFCD double warehouse throughput, stop shipping errors," Modern Materials Handling/Scan Tech News, Aug. 1996.

* cited by examiner

Fig. 1A

Select Shipping Options

Step 1: Enter or Verify Your Shipping Destination:

Ship to Home

Sam Jones
120 Lakeside Ave. Suite 100
Seattle, WA 98122

[Change Address]

Step 2: Select a Shipping Method:

| Item | Shipping Method | Estimated Arrival Date |
|---|---|---|
| Mini 10.1" Widescreen Netbook PC with Intel Atom N455 $249.00 Qty: 1 | ○ Site to Store | Tue 7/26 to Mon 8/1 |
| | ○ Standard Shipping | Thu 7/21 to Tue 7/26 |
| | ● 2- to 3-Day Shipping | Thu 7/21 to Mon 7/25 |
| | ○ 1-Day Shipping | Wed 7/20 to Thu 7/21 |

Item Total: $249.00

Shipping Cost: $0.97

Subtotal: $249.97

[Edit Order] [Continue]

Fig. 1B

Extended Shipping Options

☒ Hold at Location

☐ Location address provided as ship to address
  ☒ Look up location nearest the provided address ☐ Appointment: | 19:00 |

☐ Monday
  ☐ Tuesday
  ☐ Wednesday
  ☐ Thursday
  ☐ Friday
  ☐ Saturday

☐ Require Signature

☐ Over 21 years old

Other Options

Your Code Is (copy-and-paste into the shipping address):
HAL

Fig. 1C

Select Shipping Options

Step 1: Enter or Verify Your Shipping Destination:

Ship to Home

Sam Jones
    120 Lakeside Ave. Suite 100
    HAL
    Seattle, WA 98122

[Change Address]

Step 2: Select a Shipping Method:

| Item | Shipping Method | Estimated Arrival Date |
|---|---|---|
| Mini 10.1" Widescreen Netbook PC with Intel Atom N455 $249.00 Qty: 1 | ◯ Site to Store | Tue 7/26 to Mon 8/1 |
| | ◯ Standard Shipping | Thu 7/21 to Tue 7/26 |
| | ⦿ 2- to 3-Day Shipping | Thu 7/21 to Mon 7/25 |
| | ◯ 1-Day Shipping | Wed 7/20 to Thu 7/21 |

Item Total:     $249.00

Shipping Cost:     $0.97

Subtotal:     $249.97

[Edit Order]    [Continue]

Fig. 1D

Extended Shipping Options

☒ Hold at Location

☐ Location address provided as ship to address
☒ Look up location nearest the provided address ☐ Appointment: [ 19:00 ]

☐ Monday
☐ Tuesday
☐ Wednesday
☐ Thursday
☐ Friday
☐ Saturday

☐ Require Signature

☐ Over 21 years old

Other Options

Your Code Is (copy-and-paste into the shipping address):

http://shipopt.ly?o=12345

Fig. 1E

Extended Shipping Options

○ Never Hold at Location

● Always Hold at Location

○ Hold at Location if Arriving on These Days:

- ☐ Monday
- ☐ Tuesday
- ☐ Wednesday
- ☐ Thursday
- ☐ Friday
- ☐ Saturday

☐ Deliver by Appointment at [19:00] if Arriving on These Days:

- ☐ Monday
- ☐ Tuesday
- ☐ Wednesday
- ☐ Thursday
- ☐ Friday
- ☐ Saturday

☐ Require Signature

☐ Over 21 years old

Other Options

Your Code Is (copy-and-paste into the shipping address)

HAL

Fig. 1F

Select Shipping Options

Step 1: Enter or Verify Your Shipping Destination:

Ship to Home

Sam Jones
120 Lakeside Ave. Suite 100
http://shipopt.ly?o=12345
Seattle, WA 98122

(Change Address)  Click for more shipping options

Step 2: Select a Shipping Method:

Item

Mini 10.1" Widescreen
Netbook PC with Intel
Atom N455
$249.00
Qty: 1

---

Extended Shipping Options

☒ Hold at Location

☐ Location address provided as ship to address
    ☒ Look up location nearest the provided address ☐ Appointment: [ 19:00 ]

☐ Monday
    ☐ Tuesday
    ☐ Wednesday
    ☐ Thursday
    ☐ Friday
    ☐ Saturday ☐ Require Signature ☐ Over 21 years old Other Options

Fig. 1G

Select Shipping Options

Step 1: Enter or Verify Your Shipping Destination:

Ship to Home http://shipopt.ly?o=12345  (Change Address)  161

Step 2: Select a Shipping Method:

| Item | Shipping Method | Estimated Arrival Date |
|---|---|---|
| Mini 10.1" Widescreen Netbook PC with Intel Atom N455 $249.00 Qty: 1 | ○ Site to Store | Tue 7/26 to Mon 8/1 |
| | ○ Standard Shipping | Thu 7/21 to Tue 7/26 |
| | ● 2- to 3-Day Shipping | Thu 7/21 to Mon 7/25 |
| | ○ 1-Day Shipping | Wed 7/20 to Thu 7/21 |

☒ Hold at Location
 ☐ Location address provided as ship to address
 ☒ Look up location nearest the provided address ☐ Appointment: 19:00        ☐ Require Signature
 ☐ Monday                    ☐ Over 21 Years old
 ☐ Tuesday
 ☐ Wednesday
 ☐ Thursday         Other Options
 ☐ Friday
 ☐ Saturday                          170

162

Item Total:     $249.00
Shipping Cost:  $0.97
Subtotal:       $249.97

(Edit Order)   (Continue)

Fig. 1H

Select Shipping Options

Step 1: Enter or Verify Your Shipping Destination:

Ship to Home

| | |
|---|---|
| Name | Sam Jones |
| Address1 | 120 Lakeside Ave. Suite 100 |
| Address2 | HAL |
| City | Seattle |
| State | WA    ZIP  98122 |

Step 2: Select a Shipping Method:

| Item | Shipping Method | Estimated Arrival Date |
|---|---|---|
| Mini 10.1" Widescreen Netbook PC with Intel Atom N455 $249.00 Qty: 1 | ○ Site to Store | Tue 7/26 to Mon 8/1 |
| | ○ Standard Shipping | Thu 7/21 to Tue 7/26 |
| | ● 2- to 3-Day Shipping | Thu 7/21 to Mon 7/25 |
| | ○ 1-Day Shipping | Wed 7/20 to Thu 7/21 |

Item Total:   $249.00

Shipping Cost:  $0.97

Subtotal:  $249.97

( Edit Order )   ( Continue )

Fig. 3.1

3.100: A process for providing access to extended shipping options 3.103: providing access to extended shipping options via a shipment information specification user interface that is otherwise not configured to facilitate specification of the extended shipping options, the user interface including an element configured for specifying a first shipment information item of a first type, by:

3.106: receiving, via the user interface element, an indicator of a second shipment information item of a second type that is not the same as the first type, the second shipment information item of the second type not processed as shipment information of the first type, wherein the indicator of the second shipment information item includes a tag or a uniform resource identifier that is interpreted by a shipping provider to determine the second shipment information item

3.109: causing the shipping provider to process a shipment according to the first and second shipment information items

Fig. 3.2

3.500: The process of 3.100, wherein the causing the shipping provider to process a shipment includes:

3.502: extracting the first shipment information item from a data field that includes both the first and second shipment information items

3.504: performing address verification with the first shipment information item

Fig. 3.3

3.600: The process of 3.100, wherein the causing the shipping provider to process a shipment includes:

> 3.602: determining not to perform address verification with the first shipment information item based on contents of the second shipment information item

> 3.604: performing address verification with the second shipment information item, the second shipment information item specifying a hold at location delivery and/or an alternative delivery address

Fig. 3.4

3.800: The process of 3.100, further comprising:

> 3.802: providing a module for specifying the extended shipping options, the module configured to generate the indicator of the second shipment information item and to cause the generated indicator to be forwarded to the shipping provider

Fig. 3.5

3.1400: The process of 3.800, wherein the extended shipping options available via the module are automatically determined based on information about the shipment and/or a person associated with the shipment

Fig. 3.6

3.1800: The process of 3.100, wherein the receiving, via the user interface element, an indicator of a second shipment information item of a second type includes:

> 3.1802: receiving a uniform resource identifier that identifies a code module that is configured to provide an indication of the second shipment information item in response to receiving at least a portion of the generated uniform resource identifier

Fig. 3.7

3.1900: The process of 3.100, wherein the causing the shipping provider to process a shipment includes:

> 3.1902: incorporating the indicator of the second shipment information item into shipment information transmitted to the shipping provider by the user interface

Fig. 3.8

3.2100: The process of 3.100, further comprising:

> 3.2102: causing a remote computing system identified by the uniform resource indicator to store information about the shipment, by transmitting to the remote computing system an HTTP request that includes the information about the shipment

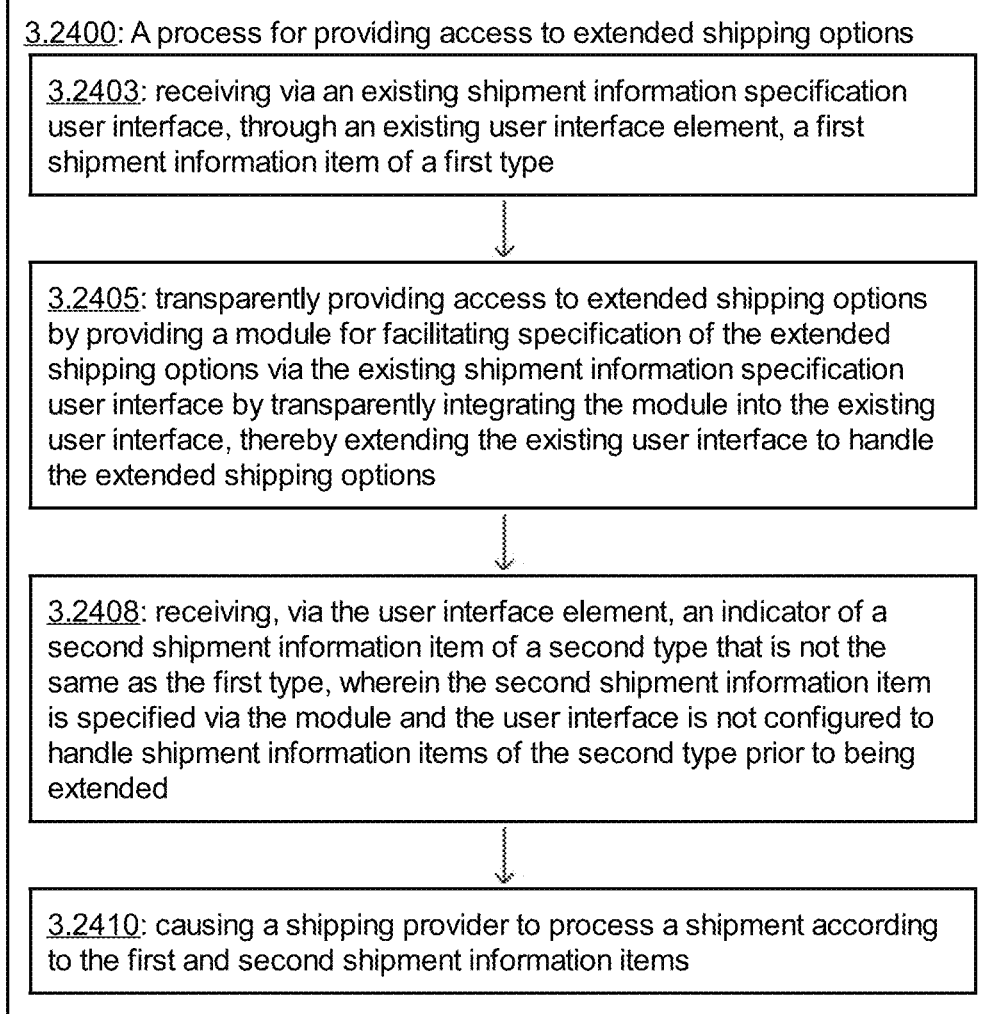
Fig. 3.9

*Fig. 3.10*

3.2700: A process for providing access to extended shipping options 3.2703: providing access to extended shipping options with respect to a shipment information specification user interface that is otherwise not configured to facilitate specification of the extended shipping options, by providing a module that specifies extended shipping options by:

3.2706: receiving a first shipment information item specified by a user via the module

3.2708: causing the first shipment information item to be transmitted as part of a second shipment information item of a second type that is not the same as the first type, the second shipment information item specified by the user via the shipment information specification user interface

3.2711: causing a shipping provider to prepare a shipment in accordance with the first and second shipment information items

*Fig. 3.11*

3.3200: A process for providing access to extended shipping options 3.3203: providing a module configured to facilitate specification of extended shipping options with respect to a shipment information specification user interface that is otherwise not configured to facilitate specification of the extended shipping options, by:

3.3205: receiving a first shipment information item specified by a user via the module

3.3206: causing an indication of first shipment information item to be inserted into part of an element of the shipment information specification user interface, the element configured for storing a second shipment information item of a second type that is not the same as the first type

3.3208: causing a shipping provider to prepare a shipment in accordance with the first and second shipment information items

*Fig. 3.12*

3.3300: A process for providing access to extended shipping options 3.3303: extracting an indicator of a first shipment information item of a first type from a second shipment information item of a second type that is not the same as the first type, wherein the indicator of the first shipment information item includes tag or a uniform resource identifier

3.3305: determining the first shipment information item by interpreting the tag or the uniform resource identifier

3.3307: causing a shipment to be prepared in accordance with the first and second shipment information items

SYSTEMS AND METHODS FOR PROVIDING EXTENDED SHIPPING OPTIONS

TECHNICAL FIELD

The present disclosure relates to methods, techniques, and systems for incorporating extended shipping options into e-commerce systems and, in particular, to methods, techniques, and systems for transparently extending an order-taking user interface provided by an online merchant to include additional shipping options.

BACKGROUND

When a buyer purchases an item as part of an electronic commerce transaction (e.g., via a Web-accessible storefront on the Internet), the buyer typically communicates with a shipping carrier (e.g., FedEx, UPS, the Postal Service) through a merchant system. For example, when a buyer purchases an item on Walmart.com, the buyer can enter his shipping address via a Web page or other interface to an e-commerce system. This address will then be transmitted by the e-commerce system to the carrier for processing of the shipment, creation of the shipping label, and ultimately, delivery of the buyer's shipment.

Shipping carriers are adding features faster than the e-commerce sector can make them available to buyers. For example, a particular carrier may offer new shipping methods (e.g., for bulk shipments, for different delivery times, for appointment-based delivery), but it may take a significant engineering effort before these methods become available to buyers through the many different e-commerce systems. In many cases, e-commerce systems may simply elect to take a "least common denominator" approach, in which they offer a static set of shipping options that are available from most or all of the commonly used shipping carriers. In some cases, a buyer may know that a particular carrier has a shipping option, but not be able to communicate the desire to utilize this option. Such limitations may elevate levels of buyer frustration and reduce customer retention.

Furthermore, a buyer typically understands his or her shipping needs in better detail than does a given merchant, or at least the developers or engineers responsible for implementing the merchant's e-commerce system. A situation may thus arise in which one or more of the buyer, the shipping carrier, and/or the merchant's shipping department know that a particular shipping option (e.g., by appointment, hold at location) is available, but the Web site developer is either oblivious to this need or is unable to prioritize the development and incorporate the desired option into the buyer's user interface.

The lack of exposure of new shipping options often results in a negative feedback loop that may raise prices to buyers and inhibit the development of further shipping options. For example, a carrier may develop and offer a new, useful shipping option. However, due to the difficulties discussed above, e-commerce systems do not widely offer the option. Then, because the option is not widely offered, buyers do not select it, and the option is little used. Because the option is little used, its performance is not optimized by the shipping carrier, resulting in higher costs to the buyer for use of the option. In addition, the carrier becomes reluctant to develop further shipping options, in view of the lack of utilization and/or success of prior efforts to offer new shipping options.

In one approach to offering access to new shipping options, some systems allow a buyer to enter comments or special instructions to the merchant. However, this approach suffers from its own drawbacks. As an initial matter, the instructions are not machine-processed, meaning that they must be read and understood by a human, thereby incurring the risk of human error and/or delay. Furthermore, there may be no standard terminology or the terms used by the buyer may not be understandable to the merchant and/or the shipping carrier. Also, there exists the risk that the merchant will altogether neglect to transmit the information to the shipping carrier, as buyer-provided comments are generally not an information element that automatically flows from a merchant system to the shipping carrier.

BRIEF DESCRIPTION OF THE DRAWINGS

FIGS. 1A-1H are example diagrams that illustrate user interface and interaction aspects according to example embodiments.

FIGS. 3.1-3.12 are example flow diagrams of shipping option extension processes performed by example embodiments.

DETAILED DESCRIPTION

Figure 2A:
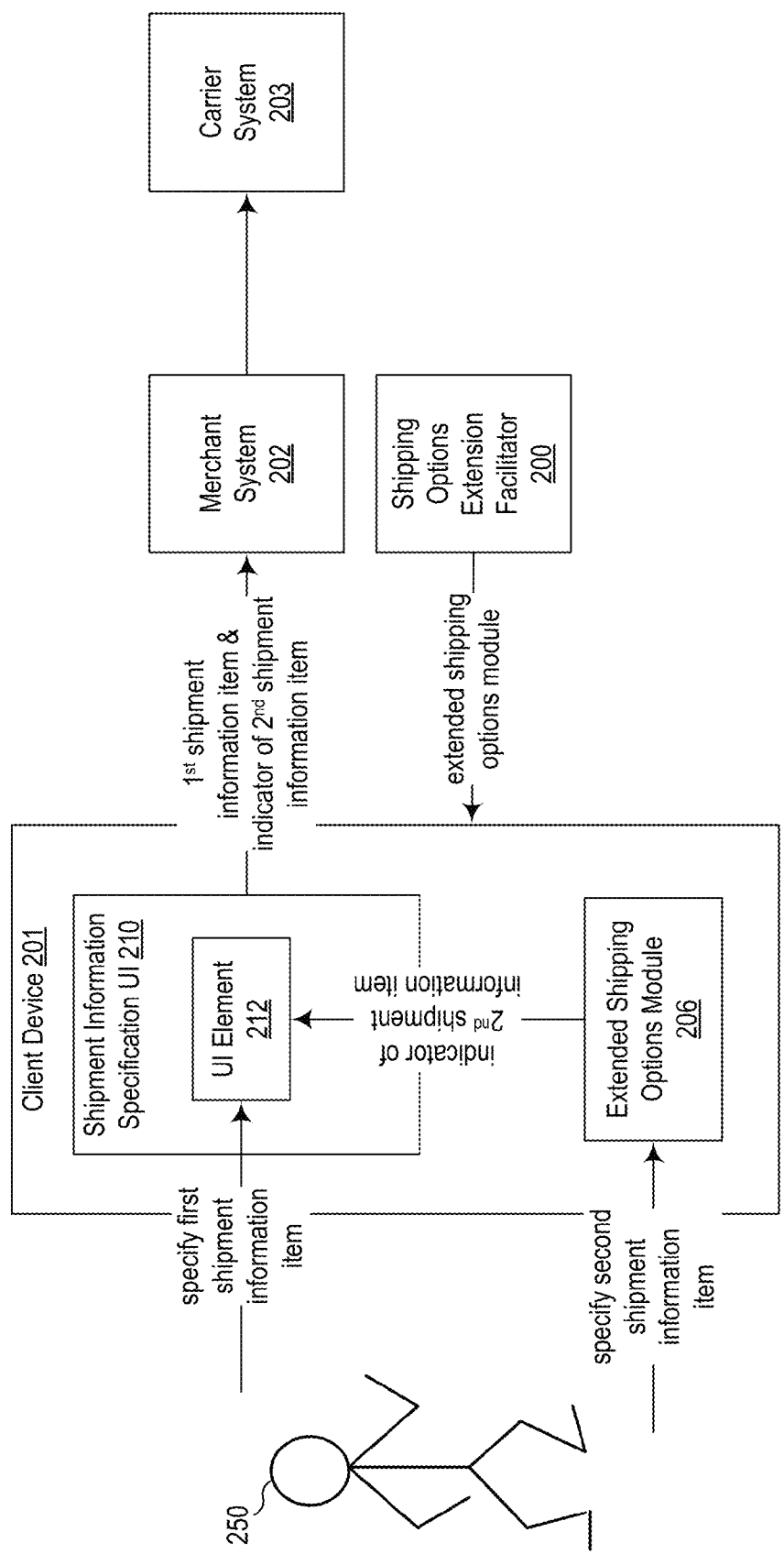
FIGS. 2A-2C are example block diagrams illustrating data flows according to example embodiments.

Embodiments described herein provide enhanced computer- and network-based methods, techniques, and systems for incorporating advanced or extended shipping options into e-commerce systems, for example, e-commerce systems that do not otherwise expose or offer such options to their buyers. As noted, many current e-commerce systems include only a subset of the shipping options that are actually provided by various carriers. As such, users may not be able to access or utilize various extended or advanced shipping options, such as "hold at location," specified-time delivery (e.g., deliver at or after 5 PM), signature requirements (e.g., deliver only upon receiving a signature), other shipping features that are newly offered by the carrier or are otherwise specific to the carrier, or the like.

Example embodiments provide a shipping options extension facilitator ("SOEF") configured to facilitate the extension of shipping options on e-commerce sites or systems. The SOEF serves to decouple e-commerce order-taking and management systems or interfaces (e.g., electronic or Web-based storefronts) from shipping providers, such that as new, extended, or advanced shipping options are introduced, used, or otherwise made available by a shipping carrier and/or third-party logistics provider, such shipping options may be made available without making changes to existing e-commerce order taking systems. A shipping provider may include any entity that provides shipping services, either directly or indirectly. As such, a shipping provider may include a merchant that offers shipping of items, a shipping carrier (e.g., USPS, Federal Express, UPS), a third-party logistics provider (e.g., an entity that intermediates between a merchant and a carrier, such as by fulfilling orders for the merchant), or the like.

In some embodiments, a merchant system includes a link or other control (e.g., button) in a shipment information specification user interface, such as may be provided during an order-taking process, to obtain shipment information items including a shipping address, name, and other shipment information. The included link, when selected by a user, activates an extended shipping options module/widget (e.g., control, panel, screen, popup, user interface control, or the like) that is provided by the SOEF. In some embodiments, the widget is "resident" on the merchant system, whereas in other embodiments, the widget is dynamically loaded or otherwise obtained from the SOEF or other source, including, for example, over a network from a shipping carrier, a third-party system or the like, so that it can present up-to-date extended shipping options to the user.

The user then interacts with the widget to specify extended shipping options. Any shipping options may be specified via the widget, although typically it will be configured to list only shipping options that are not already available via the merchant system's shipment information specification user interface. Once the user has specified the desired extended shipping options, the widget transforms these options into an indicator of the desired options, including a tag, identifier, network identifier, or other compact representation. In one embodiment, the indicator may include a tag or code (e.g., alphabetical, numerical, alpha-numerical) that represents shipping options, such as "FDX" meaning Federal Express, "HAL" meaning hold at location, and the like. In another embodiment, the indicator may be or include a uniform resource identifier (or portion thereof), such as http://shipopt.ly?o=12345. The indicator is then incorporated into the shipment information being prepared by the existing shipment information specification user interface, such as in an address, name, zip code, or other field. The prepared shipment information including the indicator of the extended shipping options can then be transferred (directly or indirectly) to the shipping service. The shipping service interprets the indicator of the extended shipping options, such as by parsing the tag or following the link to extract or otherwise obtain the specified extended shipping options. The shipping service is then able to deliver the items shipped from the merchant in accordance with the specified extended shipping options.

In some embodiments, a shipment information specification user interface is transparently extended by including or incorporating a module configured for specifying extended shipping options. Transparently extending the user interface may include storing an indication of an extended shipping option (e.g., specified via the module) in an element (e.g., field or control) that is part of the user interface and that is configured to store information of a first type (e.g., a street address, an email address, a company name) that is different than the type of the extended shipping option (or the indication thereof). This approach may include "reusing" or "dual-purposing" an existing element of the user interface, so that the user interface can act as a conduit for extended shipping options without modifying the design or implementation of the user interface.

The techniques described herein allow a buyer to communicate with a merchant's shipping department, shipping system, and/or carrier to specify desired shipping options. In addition, the described techniques provide a way to remove the above-described Web development bottleneck, allow older ecommerce systems (that perhaps are no longer maintained) to offer newer shipping options, and/or allow the development of shipping services to evolve independently from the development of e-commerce Web sites that use or present those options.

The described techniques allow new shipping options to be accessed by a buyer or other user even if a Web site does not offer that option. In doing so, the described techniques facilitate an evolution of shipping services that is decoupled from the development of shipment information specification user interfaces (e.g., the e-commerce Web pages used by buyers to specify shipment information). Furthermore, the described approaches may be compatible with existing e-commerce infrastructure, including existing Web storefronts, shopping cart systems, and the like. In addition, the described approach may be "backwards compatible" with existing systems and carriers. In other words, if a buyer requests an extended shipping option that is not available, the buyer's shipment will still be delivered successfully, even if not in accordance with the extended shipping option.

Examples of Operation

FIGS. 1A-1H are example diagrams that illustrate user interface and interaction aspects according to example embodiments. More specifically, FIGS. 1A-1C illustrate a first example interaction sequence in which a user specifies an extended shipping option and enters the specified option into an existing shipment information specification user interface. FIGS. 1D and 1E illustrate two additional extended shipping options specification user interfaces according to further embodiments. FIGS. 1F and 1G illustrate two approaches for making extended shipping options available via an existing shipment information specification user interface. FIG. 1H illustrates the use of an unused shipment information field to store and transport an indication of an extended shipping option.

FIG. 1A illustrates a shipment information specification user interface ("UI") 100. The UI 100 includes an address specification area 101 and a shipping method selection area 102. The address specification area 101 includes two user interface elements/controls: a destination shipping address field 104 and a button 106. The field 104 contains a currently selected or specified shipping address. The button 106 may be selected by the user to modify the address of field 104. For example, the button 106 may invoke an address selector (e.g., from an address book), an address editor, or the like. In other embodiments, the field 104 may itself be directly editable, such as by including one or more text edit fields or areas.

The shipping method specification area 102 is configured to facilitate specification by the user of a shipping method. In this example, the user may select from various delivery techniques, such as in-store pickup, standard shipping, 2- to 3-day shipping, or 1-day shipping. In other embodiments, other methods or options may be available.

FIG. 1B illustrates an extended shipping options specification user interface ("UI") 110 according to one embodiment. The UI 110 is configured to facilitate the specification of one or more extended shipping options in addition to the transmission of such specified options via the UI 100 of FIG. 1A, or similar. The UI 110 is typically provided by a module that is obtained from a separate source than the UI 100. For example, while the UI 100 may be provided by a merchant, the UI 110 may be presented by a module provided by the SOEF. In this manner, the merchant does not need to make any changes to the UI 100 in order to leverage and/or provide to its customers the extended shipping options provided by the UI 110. As a general matter, however, the UI 110 may be presented by a module provided by any entity, including the merchant, a shipping provider, a shipping carrier, a third-party logistics provider, or the like.

A user in the process of initiating a shipment, such as via the UI 100, may utilize the UI 110 to generate a tag or other indicator of one or more selected extended shipping options. Then, the user copies or otherwise enters the generated tag into the UI 100, so that it is transmitted to a corresponding merchant system and/or shipping carrier along with other shipment information items.

More particularly, the UI 110 includes multiple elements for specifying, storing, or representing various shipping options, including hold at location, appointment delivery, signature required delivery, and the like. In response to a user selection of one or more of the illustrated options, the UI 110 provides a tag 112 that identifies the specified shipment option. In this example, the user has selected the hold at location option. In response, the UI 110 displays the alphabetic string "HAL" as tag 112, along with an instruction to enter the tag 112 into the shipping address (e.g., "cut-and-paste into the shipping address"), such as field 104 of FIG. 1A. For example, the user may select the button 104 to activate an editor configured to modify the field 104, such as by including the tag 112 as a second street address line, as shown below in FIG. 1C.

FIG. 1C illustrates the shipment information specification user interface 100 after entry of an indicator of the extended shipping options selected as described with respect to FIG. 1B. In this example, the user clicks or otherwise selects the button 106 to invoke an address editor. Then, the user copies the tag 112 into an unused street address line of the address 104. After the user reviews and approves of the transaction, the tag 112 will be transmitted as part of the address 104 to the merchant e-commerce system and/or to the shipping carrier.

The address 104 is a first shipment information item of a first type (e.g., an address field type) and the tag 112 is a second shipment information item of a second type (e.g., an extended shipping option type). In this embodiment, the shipment information item of a first type is used as a container, holder, or vessel for embedding and transporting the shipment information item of a second type. In this manner, the second shipment information item may be transmitted to the shipping carrier via an existing mechanism, and without requiring modification of an intermediary system (e.g., the merchant e-commerce system).

FIG. 1D illustrates an extended shipping options specification user interface ("UI") 120 according to another embodiment. Again, the UI 120 is sometimes provided by a module that is obtained from a separate source (e.g., the SOEF) than the UI 100 (e.g., the merchant). In general, however, the UI 120 may be presented by a module provided by any entity, including the SOEF, the merchant, a shipping carrier, a third-party logistics provider, or the like. The UI 120 is similar to the UI 110 described with respect to FIG. 1B. However, instead of generating a tag, a uniform resource identifier ("URI") 122 is generated in response to specification of extended shipping options. The URI 122 references a network-accessible computer system (e.g., the SOEF or some third-party system) that is configured to provide the specified extended shipping options. The URI 122 may then be entered (by the user or other mechanism) into some field or element of a shipment information specification user interface. When the shipping carrier or other system receives the URI 122, it may use the URI 122 to obtain the specified extended shipping options. The system that stores and provides the extended shipping options is typically operated the same entity that operates the SOEF, but may also or instead be operated by the merchant, the carrier, or some other party.

FIG. 1E illustrates an extended shipping options specification user interface 130 according to a further embodiment. The UI 130 is similar to UI 110 and UI 120. However, the UI 130 provides additional extended shipping options, including conditional hold at location options (e.g., "hold at location if arriving on these days") and conditional appointment delivery (e.g., "deliver by appointment if arriving on these days"). As discussed with the UIs 110 and 120, the UI 120 may be presented by a module provided by any entity, including the SOEF, the merchant, a shipping carrier, a third-party logistics provider, or the like.

In some embodiments, the extended shipping options provided by UI 130 (for example) may be dynamically determined. For example, a shipment may be en route, and the buyer may realize that if it is delivered on a Thursday or Friday, that hold at location delivery is needed. In some embodiments, the buyer can make this change, such as by visiting the UI 130. In response, the carrier will implement this change while the shipment is en route.

FIGS. 1F and 1G illustrate two approaches for making extended shipping options available via an existing shipment information specification user interface. FIG. 1F illustrates a linked approach to providing access to extended shipping options. In FIG. 1F, an extended shipping options specification user interface 150 is accessed indirectly via a control in a shipment information specification user interface 140. In particular, the UI 140 includes a link 142 that, when selected by the user, initiates display of the UI 150. The UI 150 is typically provided by a module that is obtained from a separate source than the UI 140. For example, while the UI 140 may be provided by the merchant, the UI 150 may be presented by a module provided by the SOEF. In this manner, the merchant need only modify the UI 140 to include the link 142 to the UI 150, without making any other structural or implementation-related changes to the UI 140 in order to provide access to extended shipping options.

The UI 150 is similar to the UI 120 described with respect to FIG. 1D. However, in UI 150, when the user specifies extended shipping options, an indicator of the specified options (in this case, a uniform resource identifier) is automatically embedded into a destination shipping address field 144 of the UI 140. This operation may be effected in various ways, such as by providing the UI 150 with an identifier of the field 144. For example, in an HTML-based embodiment, the field 144 may be represented by way of an HTML element with a corresponding identifier (e.g., id="dest_address"). The name of this identifier may be passed or otherwise provided to the UI 150, so that logic behind the UI 150 can modify the corresponding element in the HTML DOM ("Document Object Model") tree or other data structure used to represent the UI 140. In other embodiments, a user interface element or other object may be otherwise identified (e.g., by way of a memory address, object handle, or the like), so that the UI 150 can effect modification of the object to include the indicator of the specified extended shipping options.

FIG. 1G illustrates an embedded approach to providing access to extended shipping options. In FIG. 1G, an extended shipping options specification user interface 170 is accessed directly from within a shipment information specification user interface 160. In particular, the UI 160 includes an address specification area 161 and a shipping method specification area 162. The shipping method specification area 162 includes the UI 170 embedded within it. In this example, the implementer of the UI 160 may include a frame (e.g., an HTML IFRAME or similar container) with a reference to a module that presents the UI 170. When the UI 160 is initialized and displayed, the underlying module responsible for the UI 170 is obtained and invoked in order to display the UI 170. In this manner, the UI 160 is decoupled from the UI 170, and the UI 170 may be freely modified so long as it provides some element, control, or other mechanism by which extended shipping options may be passed from the UI 170 to the UI 160 for transmission to a remote system.

Note that in the illustrated example, a uniform resource locator 172 is used as an indicator of the entire shipping address record. This uniform resource locator 172 is generated based on user interaction with the UI 170 (to select extended shipping options) and the address specification area 161 (to specify an address). In other embodiments, an approach such as is described with respect to FIG. 1F, in which the URI 172 is embedded within an address, may instead be employed.

Note that in some embodiments, the entire shipping method specification area 162 may be provided in a decoupled manner. For example, the area 162 may be dynamically customized and provided by a carrier or other entity that is separate and distinct from the merchant or other entity responsible for the UI 160.

FIG. 1H illustrates the use of an unused shipment information field to store and transport an indication of an extended shipping option. FIG. 1H illustrates a shipment information specification user interface ("UI") 180. The UI 180 is similar to the UI 100 described with respect to FIGS. 1A and 1C. However, the UI 180 includes an address specification area 181 comprising multiple editable fields for specifying a name, a first street address line, a second street address line, a city, a state, and a postal code. In this example, a tag ("HAL") indicating an extended shipping option has been inserted into an unused field, namely the second street address field 184. When the shipment information items from the area 181 are transmitted the tag will be combined with the other information items to form a shipment information record or similar data structure. A system that receives the shipment information record will then extract and interpret the tag accordingly.

Although the above embodiments primarily illustrate the use of a street address field to carry an indicator of extended shipping options, other fields, elements, or controls may be utilized. For example, the indicator may be placed in a zip code or postal code field. In the U.S. many systems allow the entry of a 9-digit zip code (e.g., "zip plus 4"), however almost no buyers use the "plus 4" portion. In some embodiments, the "plus 4" portion may be used to send the tag, either as numeric values (e.g., 1111=HAL, 1112=APPT) or as strictly alphabetic values, depending on what the e-commerce system allows. Other example fields include buyer name or title fields (e.g., "HALJoe Smith"), a company field, email address (e.g., joe@FDXAPPT7.gmail.com), or the like. Note that in some embodiments, a hidden user interface element may be employed as an "extension field" for receiving extended shipping options data from an external module.

Various extended shipping options are contemplated. Embodiments may facilitate specification of one or more of: a hold at location delivery option, an appointment delivery option, a signature required delivery option, an identification of available times to accept delivery, a reference to a signature/liability release authorization that is on file or available from a network-accessible server, an instruction to bundle multiple parcels or shipments into a single delivery, a shipment redirection notice, an authorization to release shipment to a party other than a party named on the shipment, an instruction regarding manner of cash on delivery collection, an instruction regarding inside delivery, an instruction regarding how to notify a sender or recipient that delivery has occurred, special handling instructions for a shipping carrier, an indication of acceptable or not acceptable alternate shipping methods, an indication of required recipient attributes, an indication of a hazardous condition associated with the shipment, an indication of a hazardous condition associated with a recipient location, an instruction to a shipping carrier regarding an identification protocol to be followed by a delivery driver or robot.

Example tag formats for various example extended shipping options are show in Table 1, below:

TABLE 1

| Tag | Meaning |
| --- | --- |
| HAL | Hold At Location |
| FDX | Federal Express |
| UPS | United Parcel Service |
| USPS | United States Post Office |
| APPT7 | Delivery by appointment at 7 PM |
| APPTTH7 | Delivery by appointment on Tuesday or Thursday at 7 PM |
| HAZ | Hazardous materials included |
| SIG | Signature required |
| SIG21 | Signature required from person who is at least 21 years old |

In some embodiments, a user interface for specifying extended shipping options may be dynamically configured, based on information about the buyer, the merchant, the shipping carrier, or the like. For example, the user interface may be configured only to present dynamic shipping options provided by a particular shipping carrier, based on knowledge that the shipping carrier is preferred by the buyer/user. As another example, the user interface may be configured to include time- or date-specific shipping options, such as to include seasonal shipping options offered during holiday time (e.g., holiday-themed packaging, accelerated delivery). In another example, the user interface may be configured to include options based on the location of the buyer, such as special local shipping services available in or about the buyer's location, a "hold at nearest retailer" option available to a buyer who is using a mobile device, or the like.

Figure 2B:
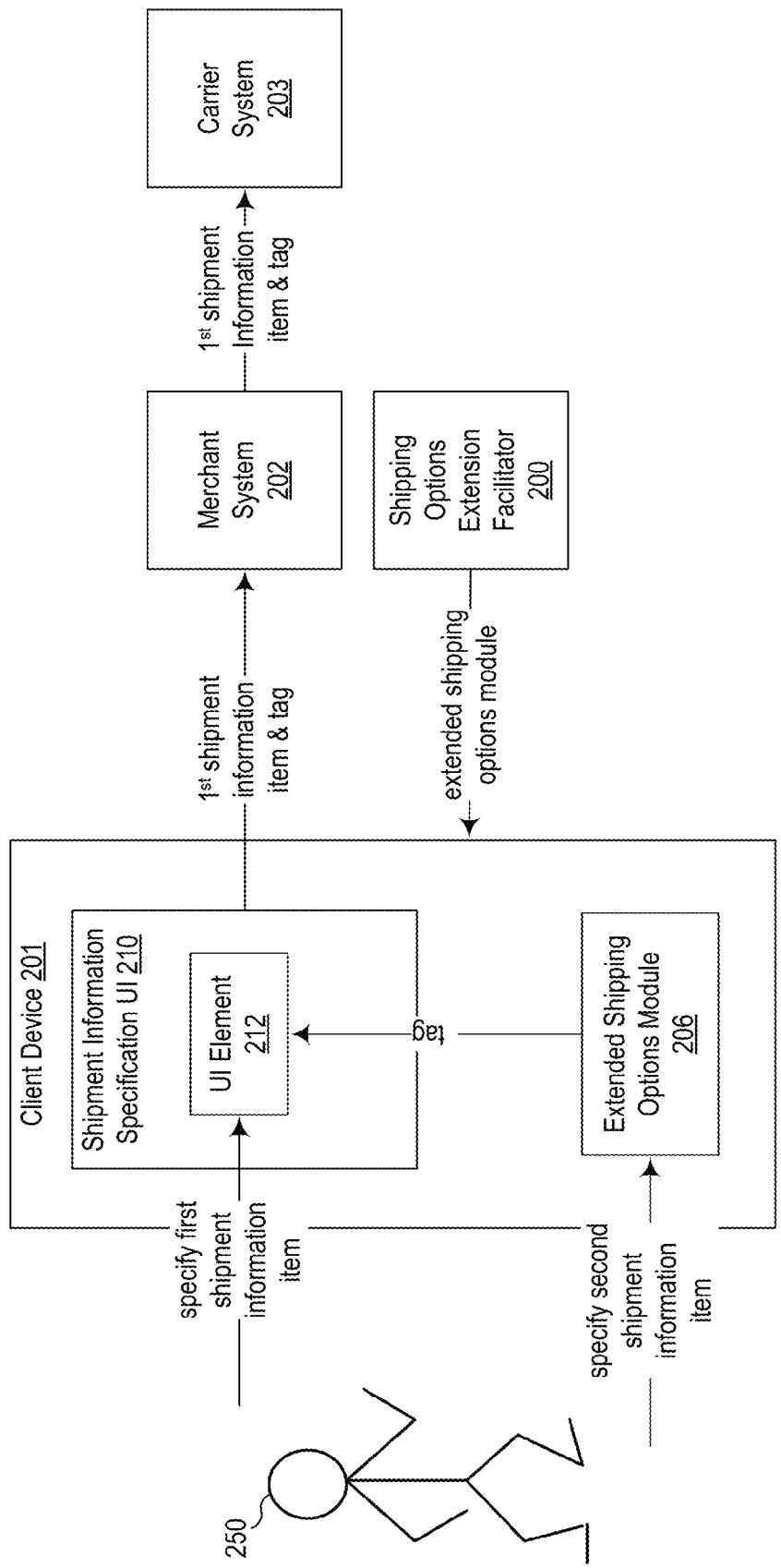
Figure 2C:
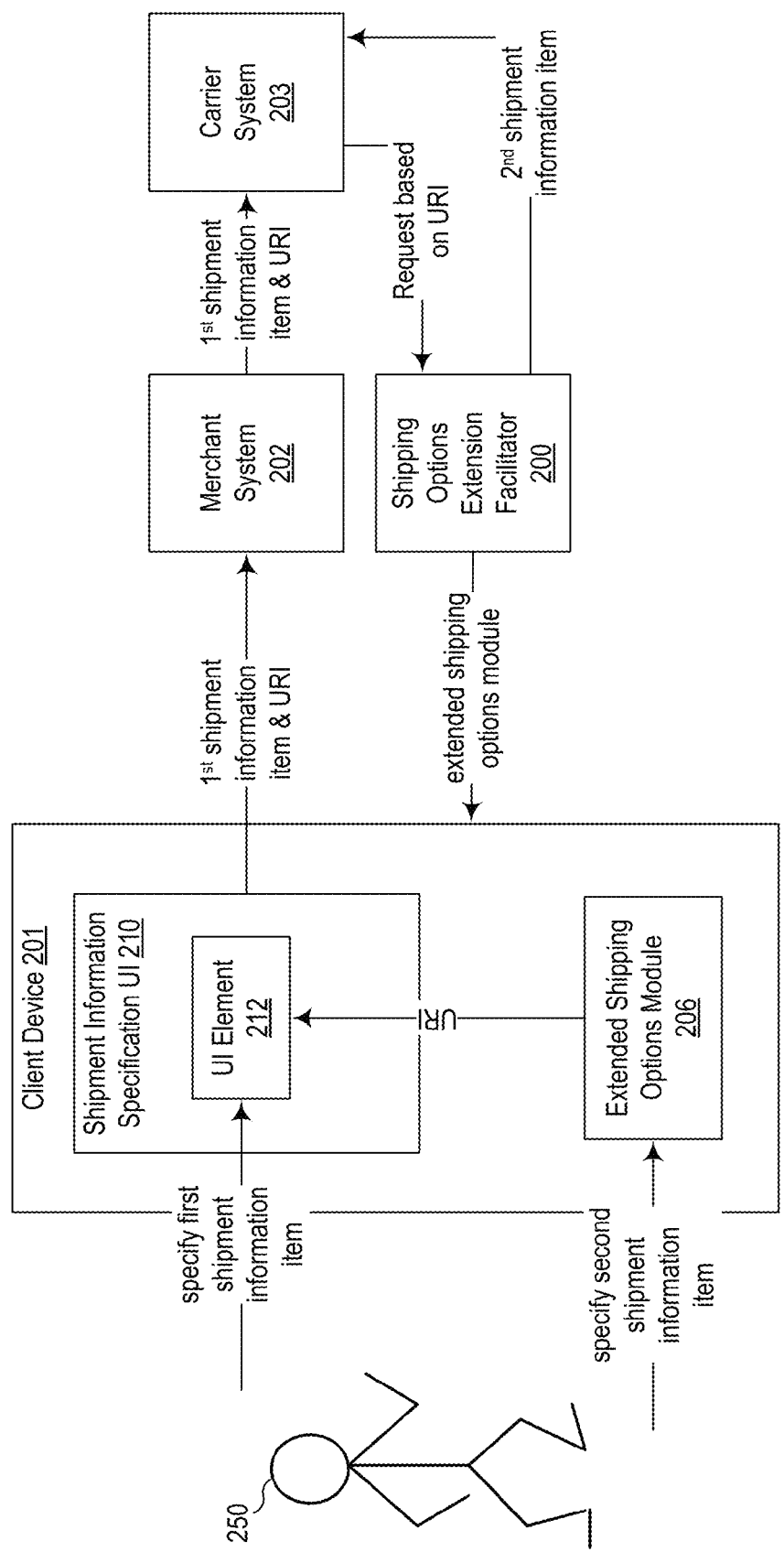

FIGS. 2A-2C are example block diagrams illustrating data flows according to example embodiments. FIG. 2A illustrates an arrangement of systems, modules, and devices according to one embodiment. The illustrated arrangement includes a shipping options extension facilitator 200, a client device 201, a merchant system 202, and a carrier system 203. The client device 201 operated by a user 250 (e.g., a buyer, data/order entry person, customer service representative) who is in the process of entering shipment information for the purposes of effectuating a shipment of an item by or via a merchant system 202.

The modules, systems, and devices illustrated with respect to FIGS. 2A-2C may be differently arranged, operated, or constituted in other embodiments. For example, the merchant system 202 and the carrier system 203 may be merged as a single system and operated by a single entity. In other embodiments, a third-party logistics provider may be present to intermediate between merchants and carriers and/or to replace one or more functions of the merchant system 202 and/or the carrier system 203. In some embodiments, the merchant system 202 and/or the carrier system 203 may be replaced with a system of a shipping provider (e.g., any entity that generally provides shipping or delivery services, either directly or indirectly).

The client device 201 includes a shipment information specification user interface ("UI") 210 and an extended shipping options module 206. Examples of the UI 210 are described with respect to FIGS. 1A-1H, above (e.g., UIs 100, 140, 160, 180). The UI 210 is typically provided by the merchant system 202, such as when the UI 210 is implemented as part of a Web page received from a Web-based e-commerce system hosted or provided by the merchant system 202. In other embodiments, the UI 210 may be part of a standalone client application, such as an order entry application.

The UI 210 includes a user interface element 212. The UI element 212 may be any control, field, aspect, or other portion of the UI 210. For example, the UI element 212 may be a text field, a drop down menu, a selection group, a chooser, a button, a hidden field, or the like. In some embodiments, the user 250 may interact with the UI element 212, such as by editing a text field or pressing a button. In other embodiments, UI element 212 is inactive with respect to direct user interaction. For example, the UI element 212 may be a text element in a document tree that represents the UI 210.

In the illustrated example, the user 250 specifies a first shipment information item via the UI element 212. Specifying the first shipment information item may include entering (e.g., typing) and address or other information into an editable text field. In other embodiments, specifying the first shipment information item may include interacting with a drop down or other selection control to set or store the shipment information item (e.g., an address, phone number) in the UI element 212.

Then, the user 250 specifies a second shipment information item via the extended shipping options module 206. In the illustrated example, the module 206 is received from the shipping options extension facilitator 200. For example, the module 206 may be a Web page or popup (possibly including JavaScript or other code) displayed via a Web browser of the client device 201. The Web page may include a user interface as well as corresponding logic for facilitating the specification of extended shipping options. Example user interfaces of example modules are discussed in more detail with respect to FIGS. 1A-1H, above (e.g., UIs 110, 120, 150, and 170).

Once the user 250 has specified the second shipment information item, the module 206 determines, generates, or prepares an indication of the second shipment information item. The indication may be a textual representation of the second shipment information item, such as a tag or code that includes an alphabetic string (e.g., "HAL"), a numeric string (e.g., "1001"), an alphanumeric string (e.g., "APPT7"), a symbolic string (e.g., "%**!"), and/or some combination of the preceding. The indication of the second shipment information item may also or instead be or include a binary (e.g., not human-readable) representation of the second shipment information item. In some embodiments, image data (e.g., a barcode) may be used to represent extended shipping options or an indicator thereof.

In another embodiment, the indication may be a network identifier that identifies (directly or indirectly) a network-accessible computing system or module that is configured to provide the second shipment information item upon request. For example, the indication may be a network address, a host name, a uniform resource identifier, or the like. The indication will typically further include an identifier, key, or other argument that can be used by the network-accessible computing system to look up or otherwise access the second shipment information.

The indication of the second shipment information item is then entered into the UI element 212. This may be a manual or automatic process. For example, the module 206 may instruct the user 250 to enter (e.g., type or copy-paste) the indication of the second shipment information item into the UI element 212. In another approach, the module 206 may automatically modify the UI element 212 to include the indication of the second shipment information item. For example, the module 206 may access the UI element 212 (e.g., by looking up its identifier in a DOM or other document data structure) and then modify the data stored in the element 212 (e.g., a shipping address) to also include the indication of the second shipment information item.

Next, the shipment information specification user interface 210 transmits the first shipment information item and the indication of the second shipment information item to the merchant system 202. In some embodiments, the indication of the second shipment information item will be transmitted as part of the first shipment information item. For example, if the indication of the second shipment information item is a tag that has been inserted into an address field, the entire address field (including the tag) will be transmitted to the merchant system 202. In other examples, the indication may be transmitted as part of an email address, a zip code, a company name, or the like.

The merchant system 202 may then process the received shipment information items. For example, the merchant system 202 may perform address verification, label printing, or similar operations based on the first shipment information item. Doing so may include parsing out or extracting the indication of the second shipment information item from the first shipment information item so that the address (or other information) stored therein can be isolated for purposes of address verification or label printing. In other embodiments, the merchant system 202 does not include any logic for processing (and does not otherwise interpret) one or more of the received shipment information items. In such embodiments, the merchant system 202 may print a shipping label that includes a tag as embedded within an address field and then forward or otherwise transmit the received items to some other system, such as the carrier system 203.

After receiving and possibly processing the received shipment information items, the merchant system 202 may forward the items onwards to the carrier system 203 in order to cause the carrier system to initiate delivery of the item ordered by the user 250. The carrier system 203 then interprets the received items and performs the appropriate and/or necessary functions to initiate delivery, such as scheduling pickup or delivery, printing a shipping label, creating and storing a shipping record in a database, or the like. At this time, the carrier system 203 may also interpret the received shipment information items to determine any extended shipping options specified thereby.

FIG. 2B illustrates data flows in an embodiment that uses a tag or similar representation of extended shipping options. The arrangement of components and systems shown in FIG. 2B is similar to that of FIG. 2A. In FIG. 2B, the extended shipping options module 206 generates and provides a tag-based representation of the extended shipping option (the second shipment information item) specified by the user 250. As noted, the tag may then be incorporated into the UI element 212 automatically or with the assistance of the user 250. The tag is then transmitted along with the first shipment information item to the merchant system 202, where it is optionally processed and then transmitted onwards to the carrier system 203. The merchant system 202 and/or carrier system 203 include logic for interpreting the tag, such as by processing the tag to determine the one or more shipping options that it represents. Interpreting the tag may include one or more of: parsing the tag into constituent parts, looking up some or all of the tag in a table or other mapping (e.g., mapping keys to shipping options), calling or interacting with an external module or third party to perform a lookup, or the like.

FIG. 2C illustrates data flows in an embodiment that uses a network identifier to facilitate transmission of and access to extended shipping options. The arrangement of components and systems shown in FIG. 2C is similar to that of FIG. 2A. In FIG. 2C, the extended shipping options module 206 generates and provides a uniform resource identifier ("URI") that identifies a network-accessible system that is configured to provide the specified second shipment information item (the extended shipping option) in response to a request. In other embodiments, the URI may be directly parsed to determine an extended shipping option without interaction with a remote system. In some embodiments, a first extended shipping option may be determined from the URI (e.g., as an embedded tag) and a second extended shipping option may be determined by interacting based on the URI with a remote system.

Generating the URI by the module 206 may include interacting with the shipping options extension facilitator 200. For example, the module 206 may transmit the specified second shipment information item to the facilitator 200, and receive in response an identifier or key that can later be used to look up the information item. The received key (e.g., 12345) can then be appended onto a network identifier of the facilitator 200 (e.g., http://shipopt.ly) to prepare a full URI (e.g., http://shipopt.ly?id=12345) that can be used to later retrieve the second shipment information item. In other embodiments, generating the URI may be accomplished without communication between the module 206 and the facilitator 200. For example, an indicator of the second shipment information item may be encoded as part of the URI based on a predefined mapping maintained by the module 206.

The URI generated by the module 206 is then entered into the UI element 212 for transmission along with the first shipment information item to the merchant system 202, as discussed above. In this example, the merchant system 202 forwards the first shipment information item and the URI to the carrier system 203. The carrier system 203 then determines the specified extended shipping option by communicating, based on the URI, with the shipping options extension facilitator 200. More particularly, the carrier system 203 transmits to the facilitator 200 a request based on the URI. In an HTTP-based embodiment, the request may be an HTTP GET that includes URI parameters, including any key-value pairs or other arguments that were part of the URI (e.g., id=12345). The facilitator 200 then determines the second shipment information item based on the received request, such as by looking up the item based on a received identifier. The facilitator 200 then transmits the second shipment information item back to the carrier system 203.

Note that the illustrated arrangement of modules may be differently constituted in some embodiments. For example, the extended shipping options module 206 may be incorporated dynamically into the shipping information specification UI 210, as discussed with respect to FIG. 1G, above. As another example, the merchant system 202 and the carrier system 203 may be integrated as a single system, rather than as distinct systems as shown. Furthermore, the shipping options extension facilitator 200 may be a component of one of the other modules, such as the carrier system 203 and/or the merchant system 202.

In other embodiments, additional modules or systems may also be present. For example, some embodiments may include a third-party logistics ("TPL") provider that intermediates between the merchant system 202 and the carrier system 203. An example TPL provider provides warehousing and shipping services to multiple merchants. A TPL provider may leverage information about the flow of orders and/or shipments to provide enhanced services to buyers, carriers, and/or merchants. These enhanced services may be surfaced or otherwise made accessible via an extended shipping options specification user interface. For example, the TPL provider may gain visibility into buyer behaviors and/or one or more merchants' near term shipping volume, by tracking orders placed in substantially real time. The TPL provider can then allocate resources and/or pricing in substantially real time, such as by transacting for shipping resources (e.g., obtaining additional resources or disposing of excess resources). The TPL provider may also or instead facilitate the performance of market research, such as by offering different pricing and delivery options to different buyers, and tracking those buyers' responses to the different options. The TPL provider may also or instead leverage user-specific information, such as may be obtained from a social network or other source of information about the user (e.g., order history). For example, specific packaging options may be presented via an extended shipping options specification user interface to a user who is known to be fashion conscious (e.g., based on interests gleaned from a social networking site). As another example, birthday-themed packaging options may be automatically presented an extended shipping options specification user interface to a user who is known (or appears to be) sending a birthday gift to a friend, as determined based on the buyer's, seller's, or recipient's social network. As a further option, location-specific delivery options may be presented via an extended shipping options specification user interface, such as a retail pickup option based on the distance between a retailer and a shipment recipient address.

Also, although certain terms are used primarily herein, other terms could be used interchangeably to yield equivalent embodiments and examples. For example, it is well-known that equivalent terms in the shipping, logistics field and in other similar or related fields could be substituted for such terms as "shipment information," "shipping carrier," "merchant," or the like. Specifically, the term "shipment information" can be used interchangeably with "shipping information," "shipment data," "delivery information," or the like. Likewise, the term "shipping carrier" can be used interchangeably with the terms "delivery service," "shipping company," or the like. In addition, terms may have alternate spellings which may or may not be explicitly mentioned, and all such variations of terms are intended to be included.

Example embodiments described herein provide applications, tools, data structures and other support to implement a Shipping Options Extension Facilitator to be used to provide extended shipping options. Other embodiments of the described techniques may be used for other purposes, including for extending a user interface generally and/or using an existing communication protocol or data records to provide, carry, or transmit information beyond that which the protocol is designed to represent or transport. In the following description, numerous specific details are set forth, such as data formats and code sequences, and the like, in order to provide a thorough understanding of the described techniques. The embodiments described also can be practiced without some of the specific details described herein, or with other specific details, such as changes with respect to the ordering of the logic, different logic, or the like. Thus, the scope of the techniques and/or functions described are not limited by the particular order, selection, or decomposition of aspects described with reference to any particular routine, module, component, and the like.

Example Processes

FIGS. 3.1-3.12 are example flow diagrams of shipping option extension processes performed by example embodiments. The illustrated logic in the following flow diagrams may be performed by, for example, one or more components or systems described with respect to FIGS. 2A-2C, above. For example, the logic of a particular flow diagram may be performed by or at one or more of the SOEF 200, client device 201, merchant system 202, and/or carrier system 203.

FIG. 3.1 is an example flow diagram of example logic for providing access to extended shipping options. In some embodiments, this process is performed by or at the merchant system 202, and functions to extend a user interface executing on a client device 201 to facilitate the specification of shipping options that could otherwise not be specified via the interface. Other components and/or systems may perform the process in other embodiments, including the client device 201, carrier system 203, and/or the SOEF 200. More particularly, FIG. 3.1 illustrates a process 3.100 that includes operations performed by or at the following block(s).

At block 3.103, the process performs providing access to extended shipping options via a shipment information specification user interface that is otherwise not configured to facilitate specification of the extended shipping options, the user interface including an element configured for specifying a first shipment information item of a first type, by: performing operation(s) of block(s) 3.106 and 3.109, described below. As discussed, the user interface may not be configured to facilitate specification of the extended shipping options, such as because it does not include user interface controls configured for selection of shipment information items of an extended shipping option type. For example, the user interface may include elements or controls for specifying name, address, telephone number, and email address, but not for specifying that appointment-based delivery is requested.

At block 3.106, the process performs receiving, via the user interface element, an indicator of a second shipment information item of a second type that is not the same as the first type, the second shipment information item of the second type not processed as shipment information of the first type, wherein the indicator of the second shipment information item includes a tag or a uniform resource identifier that is interpreted by a shipping provider to determine the second shipment information item. In some embodiments, access to extended shipping options may be provided by using an element (e.g., field, button, control) of the user interface as a mechanism for storing and/or transmitting an extended shipping option. For example, a control that is configured to receive all or part of a shipping address may be used to hold an indicator of the extended shipping option. As another example, an indicator of the extended shipping option may be incorporated into an email address field. The second shipment information item may not be processed as a shipment information item of the first type. For example, where the first type is an address field type, a merchant or carrier system that receives the second item may not treat it as an address field item.

At block 3.109, the process performs causing the shipping provider to process a shipment according to the first and second shipment information items. Causing the shipping provider to process the shipment may include transmitting the first and second shipment information items to the shipping provider, such that the shipping provider can initiate the transport of a shipment to its destination or some intermediate location. In other cases, a separate signal or indicator may be utilized to cause the shipping provider to initiate delivery.

FIG. 3.2 is an example flow diagram of example logic illustrating an example embodiment of process 3.100 of FIG. 3.1. More particularly, FIG. 3.2 illustrates a process 3.500 that includes the process 3.100, wherein the causing the shipping provider to process a shipment includes operations performed by or at one or more of the following block(s).

At block 3.502, the process performs extracting the first shipment information item from a data field that includes both the first and second shipment information items. As noted, a user interface control that is configured to specify a shipping address may also be used also to receive, store, or otherwise represent the second shipment information item. In such an example, the first shipment information item (e.g., a shipping address) and the second shipment information item (e.g., for the extended shipping option) may be packaged or otherwise combined within a single data field for transmission. Then, when the process performing the method receives that data field, the process may extract or otherwise retrieve the first item (e.g., the shipping address) in order to perform operations upon it, such as address verification, data integrity checking, or the like.

At block 3.504, the process performs performing address verification with the first shipment information item. In some embodiments, the process performs address verification by referencing an address database, normalizing the address, checking for spelling errors, or the like. In other embodiments, different operations may be performed instead or in addition. For example, the process may here prepare a shipment, such as by printing shipment-related documentation (e.g., packing list, pick list, label), communicating with a carrier system (e.g., to schedule a pickup, to transmit billing information, shipping information, label information, COD details, appointment or parcel attributes), or the like.

FIG. 3.3 is an example flow diagram of example logic illustrating an example embodiment of process 3.100 of FIG. 3.1. More particularly, FIG. 3.3 illustrates a process 3.600 that includes the process 3.100, wherein the causing the shipping provider to process a shipment includes operations performed by or at one or more of the following block(s).

At block 3.602, the process performs determining not to perform address verification with the first shipment information item based on contents of the second shipment information item. In some embodiments, the process decides to skip address verification based on the existence or contents of the second shipment information item. For example, the second shipment information item may be or include a hold-at-location instruction, which may render an address contained within the first shipment information item irrelevant.

At block 3.604, the process performs performing address verification with the second shipment information item, the second shipment information item specifying a hold at location delivery and/or an alternative delivery address. The second shipment information item may, for example, hold a hold-at-location or alternative delivery address.

FIG. 3.4 is an example flow diagram of example logic illustrating an example embodiment of process 3.100 of FIG. 3.1. More particularly, FIG. 3.4 illustrates a process

3.800 that includes the process 3.100, and which further includes operations performed by or at the following blocks(s).

At block 3.802, the process performs providing a module for specifying the extended shipping options, the module configured to generate the indicator of the second shipment information item and to cause the generated indicator to be forwarded to the shipping provider. Providing the module may include providing or including a link, button, or other control that can be used by the user to access the module. Providing the module may also or instead include transmitting the module to a client device so that it can be executed and display an extended shipping options specification user interface. Generating the indicator may include generating a tag or uniform resource identifier, or similar representation that can be used to directly or indirectly (e.g., with the assistance of a remote computing system) to determine the second shipment information item. Causing the indicator to be forwarded may include inserting or incorporating the indicator into the user interface element, so that the indicator will be transmitted (along with other shipment information items) to a carrier system or some other computing system (e.g., a merchant system).

FIG. 3.5 is an example flow diagram of example logic illustrating an example embodiment of process 3.800 of FIG. 3.4. More particularly, FIG. 3.5 illustrates a process 3.1400 that includes the process 3.800, wherein the extended shipping options available via the module are automatically determined based on information about the shipment and/or a person associated with the shipment. In some embodiments, a third-party logistics or other module automatically determines the options available via the module, based on shipment and/or user information. For example, automatically determining shipping options may include determining to offer access to particular services that are proximate, local, or near to the recipient of a shipment, such as hold at location delivery, appointment delivery, retail pickup, or the like, based on the availability of such services to the recipient (e.g., whether a retail location is within five or 10 miles of the recipient address). As another example, automatically determining shipping options may include considering substantially real time pricing information related to available shipping services, such that lower-cost services may be offered to a customer. As a further example, particular packaging or delivery options may be offered based on the time of year (e.g., during holidays, for birthdays) and possibly information associated with the recipient (e.g., their birth date).

FIG. 3.6 is an example flow diagram of example logic illustrating an example embodiment of process 3.100 of FIG. 3.1. More particularly, FIG. 3.6 illustrates a process 3.1800 that includes the process 3.100, wherein the receiving, via the user interface element, an indicator of a second shipment information item of a second type includes operations performed by or at one or more of the following block(s).

At block 3.1802, the process performs receiving a uniform resource identifier that identifies a code module that is configured to provide an indication of the second shipment information item in response to receiving at least a portion of the generated uniform resource identifier. As noted, a uniform resource identifier (or other identifier of a network-accessible system) may be used to facilitate the transmission of the second shipment information item. For example, the URI may identify the SOEF or similar module. The shipping carrier or other system may then use the URI to communicate with the SOEF in order to recover the second shipment information item.

FIG. 3.7 is an example flow diagram of example logic illustrating an example embodiment of process 3.100 of FIG. 3.1. More particularly, FIG. 3.7 illustrates a process 3.1900 that includes the process 3.100, wherein the causing the shipping provider to process a shipment includes operations performed by or at one or more of the following block(s).

At block 3.1902, the process performs incorporating the indicator of the second shipment information item into shipment information transmitted to the shipping provider by the user interface. Incorporating the indicator may include packaging the indicator along with other shipment information items in an HTTP request. In some embodiments the indicator embedded as part of the first shipment information item. For example, if the first shipment information item is an email address, the indicator may be appended to or otherwise inserted into the string that represents the email address.

FIG. 3.8 is an example flow diagram of example logic illustrating an example embodiment of process 3.100 of FIG. 3.1. More particularly, FIG. 3.8 illustrates a process 3.2100 that includes the process 3.100, and which further includes operations performed by or at the following blocks(s).

At block 3.2102, the process performs causing a remote computing system identified by the uniform resource indicator to store information about the shipment, by transmitting to the remote computing system an HTTP request that includes the information about the shipment. In some embodiments, the uniform resource indicator may be used to transmit or post information about the shipment to a remote system, so that the shipment can be tracked or otherwise managed via that system. The transmitted information may include one or more of a shipment tendered date, an order received date, a shipment tracking number, an indication of a shipping service used by the shipment, a shipment weight, a parcel size, a number of parcels, or the like.

FIG. 3.9 is an example flow diagram of example logic for providing access to extended shipping options. In some embodiments, this process is performed by or at the client device 201, and operates to extend a user interface on that client device to facilitate the specification of shipping options that could otherwise not be specified via the interface. More particularly, FIG. 3.9 illustrates a process 3.2400 that includes operations performed by or at the following block(s).

At block 3.2403, the process performs receiving via an existing shipment information specification user interface, through an existing user interface element, a first shipment information item of a first type. The shipment information item of the first type may be or include a shipping address (or any sub-field thereof), telephone number, email address, or the like. The user interface element may be any portion or control, inactive or interactive, that is configured to receive, store, or represent the first shipment information item. For example, the element may be a text field that holds a street address line of a shipping address, a zip code, an email address, or similar.

At block 3.2405, the process performs transparently providing access to extended shipping options by providing a module for facilitating specification of the extended shipping options via the existing shipment information specification user interface by transparently integrating the module into the existing user interface, thereby extending the existing user interface to handle the extended shipping options. In some embodiments, the existing user interface may be extended by embedding the module in the user interface, such as by including a container (e.g., an HTML IFRAME or any other mechanism for serving or embedding content or controls) that is configured to receive and present the module for specifying the extended shipping options. In other embodiments, the existing user interface may be extended by including a link that references the module and/or presenting a secondary window that renders the module (e.g., displaying a popup, dialog, or other user interface control). The module (e.g., contents of the IFRAME) may be hosted, served, and/or provided by the SOEF, a shipping carrier, a third-party logistics provider, or the like. The existing user interface may not include any additional logic for handling or processing the extended shipping options. In other embodiments, the existing user interface may be extended by including a link or other control that causes the module to be executed.

At block 3.2408, the process performs receiving, via the user interface element, an indicator of a second shipment information item of a second type that is not the same as the first type, wherein the second shipment information item is specified via the module and the user interface is not configured to handle shipment information items of the second type prior to being extended. For example, the first type may be an address field type, contact information type, or the like, whereas the second type is an extended shipping options type, such as a delivery time, appointment delivery, signature required delivery, or the like. As discussed elsewhere herein, the indicator of the second shipment information item may be transferred to, and received via, the user interface element in an automated or manual (e.g., typing or cutting and pasting) manner.

At block 3.2410, the process performs causing a shipping provider to process a shipment according to the first and second shipment information items. Once the shipment information items have been specified and possibly verified by the user, they may be transmitted to a shipping provider system, thereby causing the provider to process the shipment. Processing the shipment may generally include taking any actions to facilitate the transport of a shipped item from a first to a second location.

FIG. 3.10 is an example flow diagram of example logic for providing access to extended shipping options. In some embodiments, this process is performed by or at the SOEF 200, the client device 201, and/or the merchant system 202, and operates to extend a user interface on that client device to facilitate the specification of shipping options that could otherwise not be specified via the interface. More particularly, FIG. 3.10 illustrates a process 3.2700 that includes operations performed by or at the following block(s).

At block 3.2703, the process performs providing access to extended shipping options with respect to a shipment information specification user interface that is otherwise not configured to facilitate specification of the extended shipping options, by providing a module that specifies extended shipping options by: performing operation(s) of block(s) 3.2706, 3.2708 and 3.2711, described below. When performed by the SOEF 200, providing the module may include transmitting the module to the client device 201. When performed by the client device 201, providing the module may include displaying the module or a control that can be used to access the module.

At block 3.2706, the process performs receiving a first shipment information item specified by a user via the module.

At block 3.2708, the process performs causing the first shipment information item to be transmitted as part of a second shipment information item of a second type that is not the same as the first type, the second shipment information item specified by the user via the shipment information specification user interface. In some embodiments, the two shipment information items are transmitted together, that is, the first item (e.g., the extended option) may be embedded or incorporated within the second item (e.g., an address field, a company name, an email address).

At block 3.2711, the process performs causing a shipping provider to prepare a shipment in accordance with the first and second shipment information items.

FIG. 3.11 is an example flow diagram of example logic for providing access to extended shipping options. In some embodiments, this process is performed by or at the SOEF 200. In other embodiments, other modules may perform some or all of the described operations. More particularly, FIG. 3.11 illustrates a process 3.3200 that includes operations performed by or at the following block(s).

At block 3.3203, the process performs providing a module configured to facilitate specification of extended shipping options with respect to a shipment information specification user interface that is otherwise not configured to facilitate specification of the extended shipping options, by: performing operation(s) of block(s) 3.3205, 3.3206 and 3.3208, described below.

At block 3.3205, the process performs receiving a first shipment information item specified by a user via the module.

At block 3.3206, the process performs causing an indication of first shipment information item to be inserted into part of an element of the shipment information specification user interface, the element configured for storing a second shipment information item of a second type that is not the same as the first type. Inserting the indication of the first shipment information item may include modifying a user interface element (e.g., text field) or hidden field to include the indication, such as by concatenating the indication with data already present in the element.

At block 3.3208, the process performs causing a shipping provider to prepare a shipment in accordance with the first and second shipment information items.

FIG. 3.12 is an example flow diagram of example logic for providing access to extended shipping options. In some embodiments, this process is performed by or at the merchant system 202 and/or the carrier system 203 in order to recover extended shipping options via a uniform resource identifier. More particularly, FIG. 3.12 illustrates a process 3.3300 that includes operations performed by or at the following block(s).

At block 3.3303, the process performs extracting an indicator of a first shipment information item of a first type from a second shipment information item of a second type that is not the same as the first type, wherein the indicator of the first shipment information item includes tag or a uniform resource identifier. Extracting the indicator of the first item from the second item may include parsing or otherwise processing the second item to determine the presence of the indicator of the first item, and then isolating, removing, separating the indicator of the first item from the second item. For example, if the second item is an email address item (e.g., bob@+APPT+gmail.com), the process may read the item to determine whether an indicator of the first item is present, as may be indicated by the presence of delimiter characters (e.g., '+') that are not allowed or normally present in an email address. Then, the process may extract the indicator of the first item, such as by reading the characters between the special delimiter characters (e.g., "APPT").

At block 3.3305, the process performs determining the first shipment information item by interpreting the tag or the uniform resource identifier. The first shipment information item may then be determined as discussed above, such as by translating the tag or performing a network access based on the URI. In one embodiment, interpreting the tag includes using the tag as a key to look up one or more corresponding values that represent the first shipment information item. In another embodiment, interpreting the tag includes forming and transmitting a request (e.g., HTTP request) based on the URI to a remote system or module that is configured to provide the first shipment information item.

At block 3.3307, the process performs causing a shipment to be prepared in accordance with the first and second shipment information items.

Example Computing System Implementation

Figure 4:
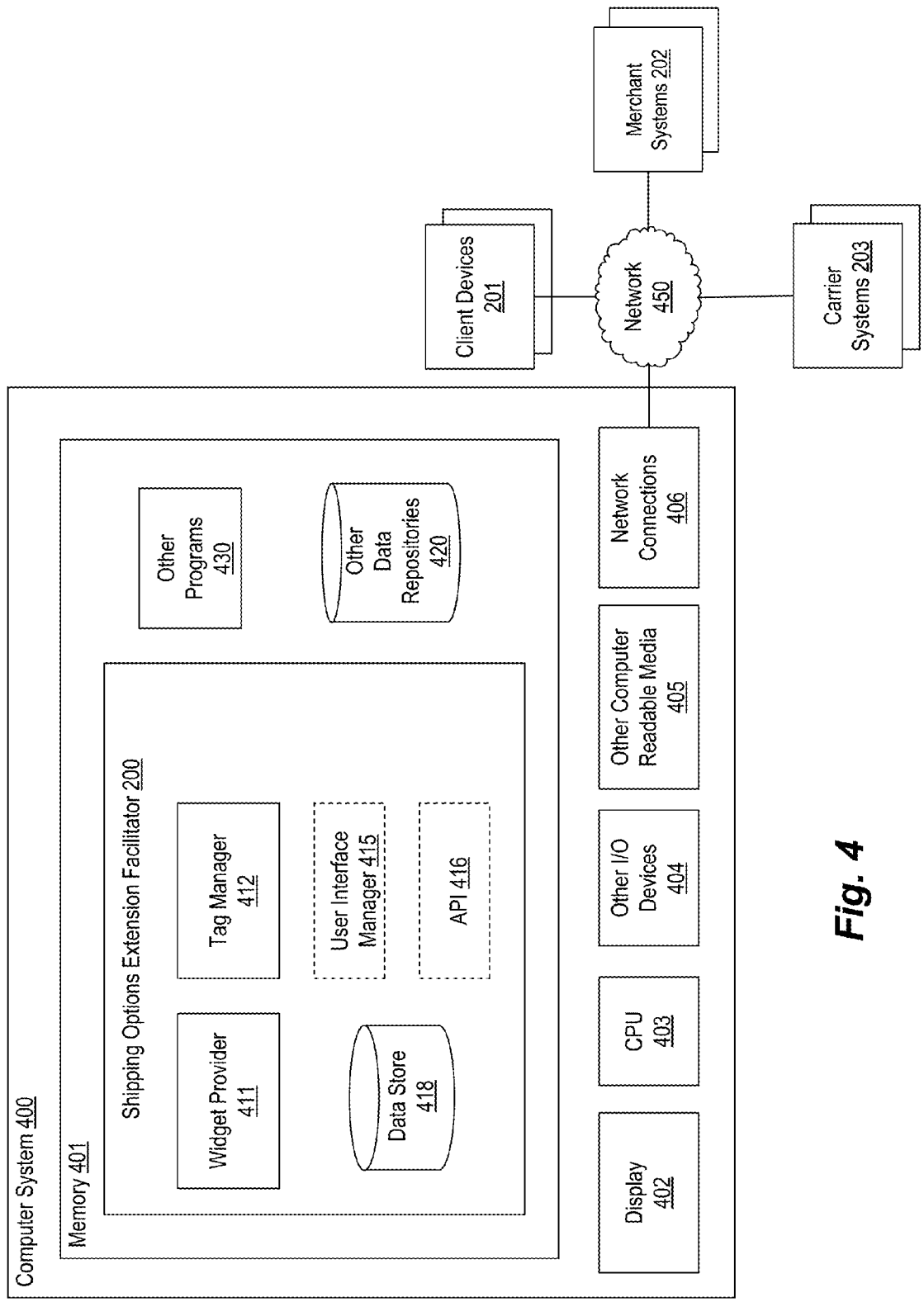
FIG. 4 is an example block diagram of an example computing system for implementing a shipping options extension facilitator according to an example embodiment.

FIG. 4 is an example block diagram of an example computing system for implementing a shipping options extension facilitator according to an example embodiment. In particular, FIG. 4 shows a computing system 400 that may be utilized to implement a shipping options extension facilitator 200.

Note that one or more general purpose or special purpose computing systems/devices suitably instructed may be used to implement the shipping options extension facilitator 200. In addition, the computing system 400 may comprise one or more distinct computing systems/devices and may span distributed locations. Furthermore, each block shown may represent one or more such blocks as appropriate to a specific embodiment or may be combined with other blocks. Also, the shipping options extension facilitator 200 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406 connected to a network 450. The shipping options extension facilitator 200 is shown residing in memory 401. In other embodiments, some portion of the contents, some or all of the components of the shipping options extension facilitator 200 may be stored on and/or transmitted over the other computer-readable media 405. The components of the shipping options extension facilitator 200 preferably execute on one or more CPUs 403 and facilitate the extension of shipping options as described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer-readable media 405 or a display 402.

The shipping options extension facilitator 200 includes a widget provider 411, a tag manager 412, a user interface manager 415, a shipping options extension facilitator application program interface 416, and a data store 418. In other embodiments, functions performed by one or more of the illustrated components may be performed externally to the shipping options extension facilitator 200.

The shipping options extension facilitator 200 interacts via the network 450 with client devices 201, merchant systems 202, and carrier systems 203. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In some embodiments, the network 450 may be or include multiple distinct communication channels or mechanisms. The client devices 201 include mobile phones, smart phones, personal digital assistants, laptop computers, tablet computers, desktop computers, and the like.

Buyers or other users (e.g., customer service representatives) may use the client devices 201 to place orders for goods or other items via the merchant systems 202. The merchant systems 202 in turn prepare shipments of ordered items and transmit shipment information about the shipments to the carrier systems 203. The carrier systems 203 are used to manage and track the delivery of the shipments by corresponding carriers (e.g., UPS or Federal Express).

The widget provider 411 manages the storage and distribution of extended shipping options modules, blocks, widgets, or the like. For example, a developer may create a new widget and provide the widget to the shipping options extension facilitator 200 for storage and further distribution by the widget provider 411. The widget provider 411 may respond to requests received from client devices 201 or merchant systems 202 during order taking. For example, a buyer may use one of the client devices 201 to interact with a Web page that includes a link to advanced shipping options, the link causing a widget to be retrieved by the client device 201 from the widget provider 411.

The tag manager 412 performs tag generation and translation services. For example, given a set of shipping options and a carrier, the tag manager 412 may generate a tag that is configured to represent that information. The tag manager 412 may also, given a tag or other identifier, respond with the shipping options and/or the carrier specified by the identifier. In some embodiments, some or all of the logic of the tag manager may be incorporated into a widget or a carrier system 203.

The UI manager 415 provides a view and a controller that facilitate user interaction with the shipping options extension facilitator 200 and its various components. For example, the UI manager 415 may provide interactive access to the shipping options extension facilitator 200, such that users or systems can obtain or configure widgets, generate tags, translate tags, and the like. In some embodiments, access to the functionality of the UI manager 415 may be provided via a Web server, possibly executing as one of the other programs 430. In such embodiments, a user operating a Web browser (or other client) executing on one of the devices/systems 201, 202, and/or 203 can interact with the shipping options extension facilitator 200 via the UI manager 415.

The API 416 provides programmatic access to one or more functions of the shipping options extension facilitator 200. For example, the API 416 may provide a programmatic interface to one or more functions of the shipping options extension facilitator 200 that may be invoked by one of the other programs 430 or some other module. In this manner, the API 416 facilitates the development of third-party software, such as user interfaces, widgets, tag translation services (e.g., for integrating functions of the shipping options extension facilitator 200 into Web applications), and the like. In addition, the API 416 may be in at least some embodiments invoked or otherwise accessed via remote entities, such as one of the carrier systems 203, to access various functions of the shipping options extension facilitator 200.

The data store 418 is used by the other modules of the shipping options extension facilitator 200 to store and/or communicate information. The components of the system 200 use the data store 418 to record various types of information, including widgets and other controls, information about shipping options provided by various carriers, information about affiliated or associated merchants (e.g., to obtain payment for services), and the like. Although the components of the system 200 are described as communicating primarily through the data store 418, other communication mechanisms are contemplated, including message passing, function calls, pipes, sockets, shared memory, and the like.

In an example embodiment, components/modules of the shipping options extension facilitator 200 are implemented using standard programming techniques. For example, the shipping options extension facilitator 200 may be implemented as a "native" executable running on the CPU 403, along with one or more static or dynamic libraries. In other embodiments, the shipping options extension facilitator 200 may be implemented as instructions processed by a virtual machine. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the shipping options extension facilitator 200, such as in the data store 418, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 418 may be implemented as one or more database systems, file systems, or any other technique for storing such information, or any combination of the above, including implementations using distributed computing techniques.

Different configurations and locations of programs and data are contemplated for use with techniques of described herein. In addition, the modules may reside on client or server systems that are physical or virtual computing. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the shipping options extension facilitator 200 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored as non-transitory contents on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet, including but not limited to U.S. patent application Ser. No. 13/478,004, entitled "SYSTEMS AND METHODS FOR PROVIDING EXTENDED SHIPPING OPTIONS" and filed May 22, 2012; U.S. Patent Application No. 61/549,682, entitled "INCORPORATING EXTENDED SHIPPING OPTIONS INTO E-COMMERCE SYSTEMS" and filed on Oct. 20, 2011; U.S. patent application Ser. No. 13/277,958, entitled "METHODS AND SYSTEMS FOR SUPPORTING THE PRODUCTION OF SHIPPING LABELS" and filed on Oct. 20, 2011; U.S. patent application Ser. No. 12/169,509, entitled "METHODS AND SYSTEMS FOR PRODUCING SHIPPING LABELS" and filed on Jul. 8, 2008; U.S. Pat. No. 7,409,353, entitled "METHODS AND SYSTEMS FOR PRODUCING SHIPPING LABELS," filed Dec. 7, 2007, and issued on Aug. 5, 2008; U.S. Pat. No. 8,126,821, entitled "METHODS AND SYSTEMS FOR SUPPORTING THE PRODUCTION OF SHIPPING LABELS," filed Dec. 31, 2008, and issued on Feb. 28, 2012; and U.S. Patent Application No. 61/019,208, entitled "METHODS AND SYSTEMS FOR SUPPORTING THE PRODUCTION OF SHIPPING LABELS" and filed on Jan. 4, 2008, are incorporated herein by reference, in their entireties.

From the foregoing it will be appreciated that, although specific embodiments have been described herein for purposes of illustration, various modifications may be made without deviating from the spirit and scope of the invention. For example, the methods and systems for performing extending shipping options discussed herein are applicable to other architectures other than an e-commerce architecture. For example, extended shipping options may be provided in non-commercial contexts, such as government services, non-profit organizations, or the like. Also, the methods and systems discussed herein are applicable to differing protocols, communication media (e.g., optical, wireless, cable, etc.) and devices (such as wireless handsets, electronic organizers, personal digital assistants, tablets, portable email machines, game machines, pagers, navigation devices such as GPS receivers, etc.).

The invention claimed is:

1. A method for providing access to extended shipping options, the method comprising:
   in a computing system, providing access to the extended shipping options via a computer-based shipment information specification user interface that is otherwise not configured to facilitate specification of the extended shipping options, the user interface including a field, wherein the field is configured to electronically store data and to specify a first shipment information item of a first type, by:
      receiving, via the field, the first shipment information item of the first type and an indicator of a second shipment information item of a second type that is not the same as the first type, the second shipment information item of the second type not processed as shipment information of the first type and instead processed to determine one or more of the extended shipping options, wherein the indicator of the second shipment information item includes a tag or a uniform resource identifier that identifies a shipping provider computing system that determines the second shipment information item, the shipping provider computing system separate from the shipment information specification user interface; and
      causing the shipping provider computing system to parse the stored data of the field to process the first shipment information item according to the first type and to process the indicated second shipment information item according to the second type, thereby determining the one or more of the extended shipping options;
   wherein the shipment information specification user interface does not communicate that the field is to be used for storing the indicator of the second shipment information item.

2. The method of claim 1, wherein the indicator of the second shipment information item is an alphanumeric tag that is interpreted by the shipping provider computing system to determine the second shipment information item.

3. The method of claim 1, wherein the indicator of the second shipment information item identifies a network-accessible computing system configured to provide the second shipment information item to the shipping provider computing system.

4. The method of claim 1, wherein the causing the shipping provider computing system to process a shipment includes: transmitting, to the shipping provider computing system, the data field that includes both the first and second shipment information items.

5. The method of claim 1, wherein the causing the shipping provider computing system to process a shipment includes:
   performing address verification with the first shipment information item.

6. The method of claim 1, wherein the causing the shipping provider computing system to process a shipment includes:
   determining not to perform address verification with the first shipment information item based on contents of the second shipment information item; and
   performing address verification with the second shipment information item, the second shipment information item specifying a hold at location delivery and/or an alternative delivery address.

7. The method of claim 1, further comprising:
   providing a computing-executable extended shipping option module for specifying the extended shipping options, the extended shipping option module configured to generate the indicator of the second shipment information item.

8. The method of claim 7, wherein the providing the extended shipping option module includes:
   including, in the shipment information specification user interface, a user interface control configured to access the extended shipping option module; and
   in response to a user selection of the control, causing the extended shipping option module to be displayed on a computer screen, the extended shipping option module including one or more controls, each configured to facilitate selection of shipment information items of types that cannot be selected by other controls of the shipment information specification user interface and that specify one or more of the extended shipping options.

9. The method of claim 7, wherein the providing the extended shipping option module includes: dynamically embedding a computer user interface widget within the shipment information specification user interface.

10. The method of claim 7, wherein the shipment information specification user interface is part of an electronic commerce computer system operated by or for a first entity, and wherein the extended shipping option module is provided by a computer system operated by a second entity that is distinct from the first entity.

11. The method of claim 7, wherein the extended shipping options available via the extended shipping option module are automatically determined based on information about a shipment and/or a person associated with the shipment.

12. The method of claim 11, wherein the information includes at least one of: an origination address of the shipment, a billing address of an order for the shipment, a destination shipping address associated with the shipment, an indication of a shipping provider received from the person, contents of the shipment, user demographics, prior shipment history of the person, indications of carriers or delivery companies that are local to the person, an indication of a lowest cost carrier or shipment option available for the shipment, a location of a retail store local to a recipient of the shipment, a location of a warehouse or supplier local to the recipient of the shipment, an indication that same day service is available for the recipient of the shipment, and/or purpose of the shipment.

13. The method of claim 7, wherein the shipment information specification user interface includes one or more controls configured for specifying shipment information, and wherein the extended shipping option module includes controls configured for specifying at least one shipment information item that is not available via the shipment information specification user interface and that invokes a delivery-related service provided by a shipping carrier.

14. The method of claim 13, wherein the at least one shipment information item that is not available via the user interface includes at least one of: a hold at location delivery option, an appointment delivery option, a signature required delivery option, a maximum or minimum age of recipient option, an identification required delivery option, and/or a shipment rerouting or redirection option.

15. The method of claim 1, further comprising: incorporating the indicator of the second shipment information item into the first shipment information item transmitted to the shipping provider computing system by the shipment information specification user interface.

16. The method of claim 15, wherein the incorporating the indicator of the second shipment information item into the first shipment information item transmitted to the shipping provider computing system includes: instructing a user to copy, type, or enter the indicator of the second shipment information item into the field, wherein the field is an address field of the user interface.

17. The method of claim 1, wherein the indicator of the second shipment information item includes a uniform resource identifier that identifies the shipping provider computing system that determines the second shipment information item, and further comprising: causing the shipping provider computing system to store information about a shipment, by transmitting to the shipping provider computing system an HTTP request that includes the information about the shipment.

18. The method of claim 17, wherein the information about the shipment includes a shipment tendered date, an order received date, a shipment tracking number, an indication of a shipping service used by the shipment, a shipment weight, a parcel size, and/or a number of parcels.

19. The method of claim 1, wherein the second shipment information item is at least one of: an identification of available times to accept delivery, a reference to a signature and/or liability release authorization that is on file or available from a network-accessible server, an instruction to bundle multiple parcels or shipments into a single delivery, a shipment redirection notice, an authorization to release shipment to a party other than a party named on the shipment, an instruction regarding manner of cash on delivery collection, an instruction regarding inside delivery, an instruction regarding how to notify a sender or recipient that delivery has occurred, special handling instructions for a shipping carrier, an indication of acceptable or not acceptable alternative shipping methods, an indication of required recipient attributes, an indication of a hazardous condition associated with the shipment, an indication of a hazardous condition associated with a recipient location, and/or an instruction to a shipping carrier regarding an identification protocol to be followed by a delivery driver or robot.

20. The method of claim 1, wherein the first type is an address field type and the second type is an extended shipping option type, and wherein the field is a text field that electronically stores in text data both an address field information item and an extended shipping option information item.

21. A system for providing access to extended shipping options from a user interface not otherwise configured to provide extended shipping options, the system comprising:
a processor;
a memory; and
instructions that are stored in the memory and that are configured, when executed by the processor, to perform a method comprising:
providing access to the extended shipping options via a computer-based shipment information specification user interface that is otherwise not configured to facilitate specification of the extended shipping options, the user interface including a field, wherein the field is configured to electronically store data and to specify a first shipment information item of a first type, by:
receiving, via the field, the first shipment information item of the first type and an indicator of a second shipment information item of a second type that is not the same as the first type, the second shipment information item of the second type not processed as shipment information of the first type and instead processed to determine one or more of the extended shipping options, wherein the indicator of the second shipment information item includes a tag or a uniform resource identifier that identifies a shipping provider computing system that determines the second shipment information item, the shipping provider computing system separate from the shipment information specification user interface; and
causing the shipping provider computing system to parse the stored data of the field to process the first shipment information item according to the first type and to process the indicated second shipment information item according to the second type, thereby determining the one or more of the extended shipping options;
wherein the shipment information specification user interface does not communicate that the field is to be used for storing the indicator of the second shipment information item.

22. The system of claim 21, further comprising:
a client device including the shipment information specification user interface, wherein a user interface control of the shipment information specification user interface is a text field operable by a user to enter the second shipment information item, and wherein the shipment information specification user interface causes the client device to transmit text data to the shipping provider computing system.

23. The system of claim 22, further comprising an extended shipping option module configured to:
in response to specification by the user of the first shipment information item via the extended shipping option module, automatically insert the first shipment information item into the text field of the shipment information specification user interface.

24. The system of claim 21, wherein the method further comprises causing the shipping provider computing system to prepare a shipment in accordance with the first and second shipment information items.

25. A non-transitory computer-readable medium storing instructions that are configured, when executed, to cause a computing system to perform a method for providing access to extended shipping options, the method comprising:

providing access to the extended shipping options via a computer-based shipment information specification user interface that is otherwise not configured to facilitate specification of the extended shipping options, the user interface including a field configured to electronically store data and to specify a first shipment information item of a first type, by:

receiving, via the field, the first shipment information item of the first type and an indicator of a second shipment information item of a second type that is not the same as the first type, the second shipment information item of the second type not processed as shipment information of the first type, and instead processed to determine one or more of the extended shipping options, wherein the indicator of the second shipment information item includes a tag or a uniform resource identifier that identifies a shipping provider computing system that determines the second shipment information item, the shipping provider computing system separate from the shipment information specification user interface; and causing the shipping provider computing system to parse the stored data of the field to process the first shipment information item according to the first type and to process the indicated second shipment information item according to the second type, thereby determining the one or more of the extended shipping options;

wherein the shipment information specification user interface does not communicate that the field is to be used for storing the indicator of the second shipment information item.

\* \* \* \* \*